US007371168B2

(12) United States Patent
Bilyeu et al.

(10) Patent No.: US 7,371,168 B2
(45) Date of Patent: May 13, 2008

(54) GAMING APPARATUS AND METHOD OF GAMING INCLUDING INTERACTIVE GAMING SYMBOLS FOR PRODUCING DIFFERENT OUTCOMES

(75) Inventors: Danny W. Bilyeu, Bozeman, MT (US); Dustin L. Fasbender, Bozeman, MT (US); Brent L. Lang, Belgrade, MT (US); Martin Dempsey, Las Vegas, NV (US)

(73) Assignee: IGT, Reno, NV (US)

( * ) Notice: Subject to any disclaimer, the term of this patent is extended or adjusted under 35 U.S.C. 154(b) by 144 days.

(21) Appl. No.: 09/971,993

(22) Filed: Oct. 5, 2001

(65) Prior Publication Data

US 2003/0069063 A1 Apr. 10, 2003

(51) Int. Cl.
*A63F 13/00* (2006.01)

(52) U.S. Cl. ........................................................ 463/20

(58) Field of Classification Search .................. 463/16, 463/17, 22–25, 30–33, 20, 29; 273/143 R, 273/138.1, 138.2, 139
See application file for complete search history.

(56) References Cited

U.S. PATENT DOCUMENTS

| | | | |
|---|---|---|---|
| 4,695,053 | A | 9/1987 | Vazquez, Jr. et al. |
| 5,308,065 | A | 5/1994 | Bridgeman et al. |
| 5,332,228 | A | 7/1994 | Schultz |
| 5,423,539 | A | 6/1995 | Nagao |
| 5,431,408 | A | 7/1995 | Adams |
| 5,449,173 | A | 9/1995 | Thomas et al. |
| 5,547,201 | A | 8/1996 | Honeywill |
| 5,704,835 | A | 1/1998 | Dietz, II |
| 5,769,716 | A | 6/1998 | Saffari et al. |
| 5,823,873 | A | 10/1998 | Moody |
| 5,833,536 | A | 11/1998 | Davids et al. |
| 5,882,259 | A | 3/1999 | Holmes, Jr. et al. |
| 5,931,467 | A | 8/1999 | Kamille |
| 5,997,400 | A | 12/1999 | Seelig et al. |

(Continued)

FOREIGN PATENT DOCUMENTS

| | | |
|---|---|---|
| AU | 710015 | 9/1997 |

(Continued)

OTHER PUBLICATIONS

*Strictly Slots*, "Break the Spell, Atronic Casino Technologies," Sep. 2000, (1 page).

(Continued)

*Primary Examiner*—Ronald Laneau
*Assistant Examiner*—Tramar Harper
(74) *Attorney, Agent, or Firm*—Bell, Boyd & Lloyd LLP

(57) ABSTRACT

A gaming method and apparatus including at least one interactive gaming symbol. The interactive gaming symbol may operate either at random, or upon the initiation and direction of a player to perceptibly interact with and transform a gaming symbol into a randomly selected new symbol or an indication of an award. A newly transformed symbol may alter the outcome of the game depending on its position with respect to one or more paylines and depending on the newly resultant combination of symbols associated with such paylines. A gaming device incorporating the use of an interactive gaming symbol may also include an interactive controller to control the orientation, movement and actions of the interactive gaming symbol.

12 Claims, 24 Drawing Sheets

U.S. PATENT DOCUMENTS

| | | | | |
|---|---|---|---|---|
| 5,997,401 | A | 12/1999 | Crawford | |
| 6,015,346 | A | 1/2000 | Bennett | |
| 6,019,369 | A | 2/2000 | Nakagawa et al. | |
| 6,033,307 | A * | 3/2000 | Vancura | 463/20 |
| 6,050,895 | A * | 4/2000 | Luciano et al. | 463/7 |
| 6,056,642 | A | 5/2000 | Bennett | |
| 6,059,289 | A | 5/2000 | Vancura | |
| 6,089,976 | A | 7/2000 | Schneider et al. | |
| 6,089,977 | A * | 7/2000 | Bennett | 463/20 |
| 6,095,921 | A | 8/2000 | Walker et al. | |
| 6,102,798 | A | 8/2000 | Bennett | |
| 6,120,031 | A | 9/2000 | Adams | |
| 6,135,885 | A | 10/2000 | Lermusiaux | |
| 6,142,873 | A | 11/2000 | Weiss et al. | |
| 6,142,875 | A | 11/2000 | Kodachi et al. | |
| 6,159,095 | A | 12/2000 | Frohm et al. | |
| 6,159,098 | A | 12/2000 | Slomiany et al. | |
| 6,176,487 | B1 | 1/2001 | Eklund et al. | |
| 6,190,254 | B1 | 2/2001 | Bennett | |
| 6,190,255 | B1 | 2/2001 | Thomas et al. | |
| 6,220,959 | B1 | 4/2001 | Holmes, Jr. et al. | |
| 8,210,279 | | 4/2001 | Dickinson | |
| 6,251,013 | B1 * | 6/2001 | Bennett | 463/13 |
| 6,270,411 | B1 | 8/2001 | Gura et al. | |
| 6,290,600 | B1 * | 9/2001 | Glasson | 463/20 |
| 6,299,165 | B1 | 10/2001 | Nagano | |
| 6,299,170 | B1 | 10/2001 | Yoseloff | |
| 6,302,398 | B1 | 10/2001 | Vecchio | |
| 6,309,300 | B1 * | 10/2001 | Glavich | 463/26 |
| 6,311,976 | B1 | 11/2001 | Yoseloff et al. | |
| 6,319,124 | B1 | 11/2001 | Baerlocher et al. | |
| 6,319,125 | B1 * | 11/2001 | Acres | 463/25 |
| 6,322,078 | B1 | 11/2001 | Adams | |
| 6,358,144 | B1 | 3/2002 | Kaddlic et al. | |
| 6,364,766 | B1 | 4/2002 | Anderson et al. | |
| 6,419,579 | B1 | 7/2002 | Bennett | |
| 6,439,993 | B1 | 8/2002 | O'Halloran | |
| 6,454,266 | B1 | 9/2002 | Breeding et al. | |
| 6,494,454 | B2 | 12/2002 | Adams | |
| 6,494,785 | B1 | 12/2002 | Gerrard et al. | |
| 6,517,432 | B1 * | 2/2003 | Jaffe | 463/16 |
| 6,520,855 | B2 | 2/2003 | DeMar et al. | |
| 6,551,187 | B1 * | 4/2003 | Jaffe | 463/20 |
| 6,558,254 | B2 | 5/2003 | Baerlocher et al. | |
| 6,561,900 | B1 * | 5/2003 | Baerlocher et al. | 463/20 |
| 6,565,433 | B1 | 5/2003 | Baerlocher et al. | |
| 6,565,434 | B1 | 5/2003 | Acres | |
| 6,589,114 | B2 * | 7/2003 | Rose | 463/20 |
| 6,602,136 | B1 | 8/2003 | Baerlocher et al. | |
| 6,604,740 | B1 | 8/2003 | Singer et al. | |
| 6,682,073 | B2 | 1/2004 | Bryant et al. | |
| 6,692,356 | B2 | 2/2004 | Baerlocher et al. | |
| 6,731,313 | B1 * | 5/2004 | Kaminkow | 715/839 |
| 6,786,818 | B1 * | 9/2004 | Rothschild et al. | 463/20 |
| 6,981,635 | B1 * | 1/2006 | Hughs-Baird et al. | 235/375 |
| 2002/0016200 | A1 * | 2/2002 | Baerlocher et al. | 463/20 |
| 2002/0052233 | A1 | 5/2002 | Gauselmann | |
| 2003/0064802 | A1 * | 4/2003 | Rodgers et al. | 463/30 |
| 2004/0048646 | A1 * | 3/2004 | Visocnik | 463/16 |

FOREIGN PATENT DOCUMENTS

| | | | |
|---|---|---|---|
| AU | 199917318 | A1 | 9/1999 |
| CA | 2341927 | | 9/2001 |
| EP | 60019 | A1 | 9/1982 |
| EP | 0 945 837 | A2 | 9/1999 |
| EP | 0984408 | A2 | 3/2000 |
| EP | 1 083 531 | A1 | 3/2001 |
| EP | 1205894 | A2 | 10/2001 |
| EP | 1 205 894 | | 5/2002 |
| EP | 1150261 | | 10/2002 |
| GB | 2097160 | | 10/1982 |
| GB | 2098781 | | 11/1982 |
| GB | 2101380 | | 1/1983 |
| GB | 2144644 | A * | 3/1985 |
| GB | 2262642 | | 5/1993 |
| GB | 2372132 | | 8/2002 |
| WO | WO 9732285 | | 9/1997 |
| WO | WO 00/12186 | | 3/2000 |
| WO | WO 00/32286 | * | 6/2000 |
| WO | WO 00/66235 | | 11/2000 |
| WO | WO 00/76606 | A1 | 12/2000 |
| WO | WO 03/030116 | | 4/2003 |

OTHER PUBLICATIONS

Atronic Descritpion of the break the Spell as found at: http://www.atronic.com/products/videoslots/breakthespell/content.shtml, visited on May 14, 2002 (1 page).
Spintek Description of Morph'un, 2000, (1 page).
Namco ITU trademark application information, Jul. 11, 2000, (1 page).
Bally's Cash Encounters found at: http://www.ballygaming.com/gameroom/video/cash_ecounters.asp, visited on Dec. 17, 2001 (1 page).
Atari Inc. "Asteroids" Flyer, (Circa 1979, USA).
U.S. Appl. No. 09/686,308 "Gaming Device Having Interacting Symbols" (filed Oct. 11, 2000).
Adders & Ladders Brochure by Barcrest, available Jul. 2001.
Andy Capp Article written by Strictly Slots published in Feb. 2002.
Andy Capp Hits the Bullseye As a New Evo™ Videol, written by Bally Gaming Systems, published in 2001.
Bally Live!Special Global Gaming Expo 2002 Issue written by Bally Gaming Systems, published in Fall 2002.
Big Bang Piggy Banking Advertisement, written by WMS Gaming, Inc., published prior to 2000.
Black Swan Paytable Display written by IGT, published prior to 2001.
Boot Scootin Article written by Strictly Slots/Aristocrat Leisure Industries, PTY Ltd., available prior to Feb. 24, 2003.
Break the Spell Article written by Strictly Slots/Atronic Casino Technology, Ltd., published in Sep. 2000.
Break the Spell Atronic Web Page, published in Jan. 2001.
Break the Spell Brochure, published in 1999.
Cash Chameleon Advertisement written by Aristocrat, published in Apr. 2001.
Cash Encounters Bally Gaming written by Strictly Slots, Apr. 2001.
Cossack Dancer Advertisement written by Olympic Video Gaming, published prior to 2002.
Description of "ROAD HOG"Gaming Device and Advertisement by Barcrest, available Jul. 2001.
Description of Expanding Symbol written by IGT, available in Sep. 1999..
Description of Gaming Machine with Animating Symbols, IGT, prior to Jun. 29, 2000.
Description of Symbol Feature in Australian UFO Gaming Machine, Barcrest, Ltd., on or before the month of December in the year 1995.
Description of Traveling Symbols, written by IGT, available in Sep. 1999.
Double Diamond Line Advertisement written by Bally Gaming Systems, published in 2000.
Easy Street Advertisements printed on Jan. 15, 2001.
Easy Street Article (Casino Data Systems) by Strictly Slots published 2000.
Elvis Advertisement by IGT, published in 1999.
ENCHANTED FOREST™ Gaming Description from Aristocrat, available in 1994.
Enchanted Unicorn Advertisement written by IGT, published in 2001.
Fishin'Buddies Article published in Strictly Slots/Anchor Games, published in Apr. 2001.
Ghoulish Gamble Advertisement, written by Konami Australia Pty. Ltd., published prior to Sep. 2000.

Goooaall, Bally Gaming, Inc., on or before the month of December in the year 2000.
Happy Camper Advertisement written by IGT, published in 2001.
Introducing the "Smiling Ape" Machine Advertisement (including Joker's Wild Poker description) written by IGT, published prior to 2001.
Jackpot Party Brochures and Articles by WMS Gaming, Inc., published 1998, 1999, 2000.
Joker's Wild Advertisement written by IGT, published prior to 2001.
Little Green Men, Jr. Advertisement written by A.C. Coin and Slot Services Company, published prior to 2002.
Loco Loot Article written by Strictly Slots/Aristocrat Leisure Industries, PTY Ltd., published in May 2002.
Money Mountain Article written by Strictly Slots/Aristocrat Leisure Industries, PTY Ltd., published in Jun. 2002.
Mystery Mine Advertisement written by Konami Australia Pty. Ltd., published prior to Jan. 1999.
Penguin Pays Advertisement written by Aristocrat Incorporated, published in 1998.
Pink Panther Advertisement and Article, written by IGT, published in 2000.
REEL MAGIC™ Gaming Machine Description written by IGT, available in 1986.
Run for Your Money Brochure by IGT, published in 1998.
Run For Your Money by Barcrest, available Jul. 2001.
Slotopoly Brochure by IGT, published in 1998.
South Park Advertisement written by IGT, available in Sep. 1999.
Spiker the Biker by Barcrest, available Jul. 2001.
The Basics of Winning Video Poker (Chapter VI Deuces Wild & Chapter VII Jokers Wild) written by J. Edward Allen, published in 1990.
Wild Streak Advertisement written by WMS Gaming, Inc., published Mar. 2001.
Winning Streak Web Site Printout by WMS Gaming, Inc. printed Mar. 21, 2001.
Your Real Key to Gaming Success Advertisement (including Roll Over Beethoven and Wild Fortune) written by Olympic Video Gaming, published prior to May 10, 2002.

* cited by examiner

210

330

GAMING APPARATUS AND METHOD OF GAMING INCLUDING INTERACTIVE GAMING SYMBOLS FOR PRODUCING DIFFERENT OUTCOMES

CROSS REFERENCE TO RELATED APPLICATIONS

This application is related to the following commonly owned co-pending patent applications: "Gaming Device Having Symbol Stacks," filed on Jul. 31, 2002, having U.S. patent application Ser. No. 10/209,704; and "Gaming Device With Traveling Reel Symbols," filed on Apr. 9, 2003 having U.S. patent application Ser. No. 10/409,965.

BACKGROUND OF THE INVENTION

1. Field of the Invention

The present invention relates generally to gaming devices and methods. More specifically, the present invention relates to gaming methods, devices and systems wherein interactive gaming symbols are utilized to potentially alter the perceived outcome of a game.

2. State of the Art

Electronic games and their methods and apparatus for use are well known in the art. Electronic games include games of chance, games of skill, and games involving both skill and chance. Examples of patents describing various games of chance include U.S. Pat. No. 5,833,536 to Davids et al. (Nov. 10, 1998), U.S. Pat. No. 5,769,716 to Saffari et al. (Jun. 23, 1998), U.S. Pat. No. 5,820,460 to Fulton (Oct. 13, 1998) and U.S. Pat. No. 5,947,820 to Morro et al. (Sep. 7, 1999).

FIG. 1 is a block diagram of an exemplary electronic gaming device 100 as found in the art. An electronic gaming device 100 may conventionally include a microprocessor or other computer 104 having a central processing unit (CPU) 106 and memory 108. The computer may be coupled to a number of peripheral devices such as, by example only, a display screen 110 (e.g., a cathode ray tube (CRT), plasma display, liquid crystal display (LCD), and/or a display based on light emitting diodes (LED)), possibly having a touch-screen input 112 (see U.S. Pat. No. 5,951,397 to Dickinson (Sept. 14, 1999)) for display of graphics associated with one or more games playable on gaming device 100. Buttons, keys or other user input devices 114 are also operably coupled to CPU 106 for initiating game play and for other functions associated with play of a game. Preferably a coin, currency or card acceptor device 116 (to accept a credit card, gaming card, smart card and the like) permits a player to enable play of a game by placing one or more wagers. The electronic game may also include a separate scoreboard display 118 to indicate a player's success, or display the player's accumulated winnings. A coin and/or currency dispenser 120 may also be included, or a player's winnings credited back to him or her using the card acceptor 116.

Electronic games may also be coupled to one or more other computers such as a central computer 130 of a casino, e.g. via a network card 122 and link 124, modem 126 or the like. The game parameters 128, such as how, when and where particular images will appear on the display screen 110, how the game works and how to operate the various elements operably coupled to the computer 104, are stored in the memory 108. Often, the electronic game 100 may be housed in a structural and/or decorative housing 102 (shown in broken lines) as is well known and understood by those of ordinary skill in the art.

As noted above, initiating an electronic game can be done as simply as by inserting a coin, token, or other type of currency. Another more comprehensive example of initiating a game includes inserting an identification card, such as a "smart card" having a programmed microchip or a magnetic strip coded with a player's identification, credit totals and other relevant information. See U.S. Pat. No. 5,265,874 to Dickinson et al. (Nov. 30, 1993). It is also known to use a writeable identification card, such as a smart card to eliminate the need for a network or direct connection between remote systems and a common controller or point database such as is described in U.S. Pat. No. 5,806,045 to Biorge et al. (Sep. 8, 1998). Promotional point and credit information may be retrieved, recorded and updated using a smart card. Additionally, it is known to transfer money to a game through an electronic funds transfer as described in U.S. Pat. No. 5,902,983 to Crevelt et al. (May 11, 1999).

In addition to the manner described above, it is also possible to participate in a game of chance via the Internet. This is typically accomplished through a casino or game host site offering displays similar to those found in conventional electronic games. Generally, to play a game of chance via the Internet, a software file is downloaded to a player's computer or terminal, which may then be used to install the necessary software for the game and/or access the casino or game host Internet site. However, such gaming may also be "streamed" across the Internet as with video and audio streaming techniques. As with a conventional electronic game, Internet electronic games may be accessed using an identification code or name to identify a specific player and retrieve that player's credit total or play history.

Existing electronic game displays typically include multiple images representing various aspects of a game such as a game portion, a credit total portion and a wager amount portion. Other electronic game displays include an additional bonus award portion to indicate an amount of a bonus award which may be won, typically through multiple or secondary games. See U.S. Pat. No. 5,851,148 to Brune et al. (Dec. 22, 1998) and U.S. Pat. No. 5,911,418 to Adams (Jun. 15, 1999).

Bonus gaming, also known in the art, includes employing a secondary game, often a different type of game than that of the primary game, as an additional activity for a player of the primary game. Implementation of a bonus game includes providing a game of chance, such as for example, one like that described above with reference to FIG. 1, as a first or a primary gaming unit. Another gaming unit is then provided as a secondary, bonus game which is typically accessible upon receipt of a winning hand (in the case of a card game) or the occurrence of a specified symbol, icon, or indicia or one or more specific combinations of the same during play of the primary gaming unit. Often the existence of a bonus game serves to attract a player though the perception of having increased opportunity to win during the player's gaming activities.

More recently, electronic games have began to incorporate gaming symbols or indicia in primary games and/or secondary games which act as a wild card or interact with other gaming symbols in a limited sense. For example, Atronic Casino Technologies has introduced a game known as "Break the Spell" which includes a wizard symbol. The wizard symbol acts as a wild card whenever appearing on reel 2, 3 or 4 of a 5 reel video slot machine. When the wizard appears on one of the specified reels, he comes off of his position on the reel and moves along the same reel to positions along the other paylines substituting for any symbol that would result in a win along the respective paylines.

Thus, if the wizard shows up on reel 2, then all of the symbols of reel 2 appearing on a payline will effectually become wildcards.

"Break the Spell" utilizes the wizard in bonus gaming as well. In the bonus round the player is allowed to select one of five frogs displayed on the screen. The selected frog is then transformed by the wizard into a new character or symbol revealing the amount of the bonus award if any.

While Atronic reveals a symbol which interacts with additional symbols of an array, the wizard only interacts with symbols located on the same reel upon which the wizard appears. Additionally, the wizard automatically interacts with any and all symbols located on that particular reel and which are positioned within a payline. Thus, there is no randomness regarding which symbols will be transformed by the wizard. Additionally, the wizard always changes a symbol on a given payline to a new symbol which will result in a win on that payline. Thus, there is also a lack or randomness with regard to the resultant transformation of a symbol. Additionally, "Break the Spell" fails to incorporate any player interaction other than the selection of one of the five identical symbols displayed during the bonus round.

Another example includes Spintek Gaming Technologies' Morph'un™ gaming device. The Morph'un™ gaming device includes a five reel video slot game wherein certain symbols, when matched on a payline, morph or change into another symbol. The new symbols act as multipliers to the base win amount. The amount of the multiplier is affected by the number of "morph" symbols located on a given payline.

However, similar to Atronic's device, there is no randomness regarding which of the symbols on a given payline will interact with each other, nor is there any randomness in what the subsequent outcome will be for such an interaction. Additionally, Morph'un™ fails to incorporate player control or interaction in selecting which symbols should interact with one another. Rather, the interaction between any symbols in the "Morph'un" game is automatic upon the matching of morph symbols on a given payline.

There is a continued need to improve gaming methods and devices with respect to their ability to attract and maintain player attention. Thus, in view of the shortcomings in the art, it would be advantageous to provide a gaming device and method which incorporates at least one interactive symbol for interacting with at least one other symbol to produce a third distinct symbol through randomness and/or player interaction.

It would additionally be advantageous to provide a gaming device and method with the perception of potentially increasing or adding to the winnings of a primary game's initial outcome by alteration of the primary game's initial outcome and without the need to resort to conventional bonus type gaming.

Additionally, it would be advantageous to provide a gaming device and method which more easily attracts and maintains the interest of a player through potential interaction and the perception of potentially increased winnings.

BRIEF SUMMARY OF THE INVENTION

In accordance with one aspect of the invention a method of conducting a game of chance is provided. The method includes providing a player with an opportunity to place a wager and displaying a randomly generated combination of symbols in response thereto. Additionally, at least one interactive symbol is displayed in conjunction with the randomly generated combination of symbols. At least one symbol is randomly selected from the displayed combination of symbols for perceived interaction with the interactive symbol. The at least one symbol is then perceptibly transformed through perceived interaction with the at least one interactive symbol. The perceived transformation may result in the display of an award, such as a number of credits or a multiplier, or, alternatively, the perceived transformation may result in the display of a new and different symbol. If a new and different symbol results from the transformation, any paylines associated with the transformed symbol are potentially altered.

In accordance with another aspect of the invention, another method of conducting a game of chance is provided. The method includes providing a player with an opportunity to place a wager and displaying a randomly generated combination of symbols in response thereto. Additionally, at least one interactive symbol is displayed in conjunction with the randomly generated combination of symbols. The player is then provided with an opportunity to stimulate perceived interaction between the interactive symbol and at least one of the combination of symbols. Upon such perceived interaction, the at least one symbol is then perceptibly transformed into another symbol or indicia of some other award.

In accordance with another aspect of the invention, yet another method of conducting a game of chance is provided. The method includes providing a player with an opportunity to place a wager and randomly selecting at least one combination of symbols in response to the wager being placed. The combination of symbols is displayed including at least one interactive symbol. The combination of symbols, less the interactive symbol, is then perceptibly replaced with new symbols. At least one of the new symbols is then transformed into a new symbol through perceived interaction with the interactive symbol. Alternatively, an indicia of an award might result from the perceived transformation.

In accordance with yet another aspect of the invention, a gaming device is provided. The gaming device includes a display configured to exhibit a combination of symbols selected from a plurality of symbols including at least one interactive symbol. The device also includes a random number generator for randomly selecting the combination of symbols from the plurality of symbols and, upon selection of the interactive symbols, randomly selecting at least one other symbol of the combination of symbols to perceptibly transform the at least one other symbol into a different symbol.

In accordance with another aspect of the invention, another gaming device is provided. The gaming device includes a display configured to exhibit a combination of symbols selected from a plurality of symbols including at least one interactive symbol. The device also includes a random number generator for randomly selecting the combination of symbols from the plurality of symbols. Additionally, an input device is included whereby a player, upon selection of the interactive symbol by the random number generator as one of the combination of symbols, may select at least one other symbol of the combination causing the at least one interactive symbol to perceptibly interact with and transform the at least one other symbol into a different symbol.

In accordance with another aspect of the invention, another gaming device is provided. The device includes a display configured to exhibit an array of symbols selected from a plurality of symbols including at least one interactive symbol. The device further includes a random number generator for randomly selecting the array of symbols from the plurality of symbols. Additionally, the gaming device includes a device associated with the display and configured to provide a perception to a viewer of the display that the at least one interactive symbol, upon selection by the random number generator, chases at least one other symbol from the array of symbols, catches the at least one other symbol, and transforms the at least one other symbol into either a different symbol or an indicia of an award.

In accordance with yet another aspect of the invention, another gaming device is provided. The device includes a display configured to exhibit an array of symbols selected from a plurality of symbols including at least one interactive symbol. The device further includes a random number generator for randomly selecting the array of symbols from the plurality of symbols. Additionally, the gaming device includes a device associated with the display and configured to provide a perception to a viewer of the display that the at least one interactive symbol, upon selection by the random number generator, causes all other symbols in the array to be replaced with new symbols, subsequently interacts with at least one new symbol and transforms the at least one new symbol into a different symbol.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 1:
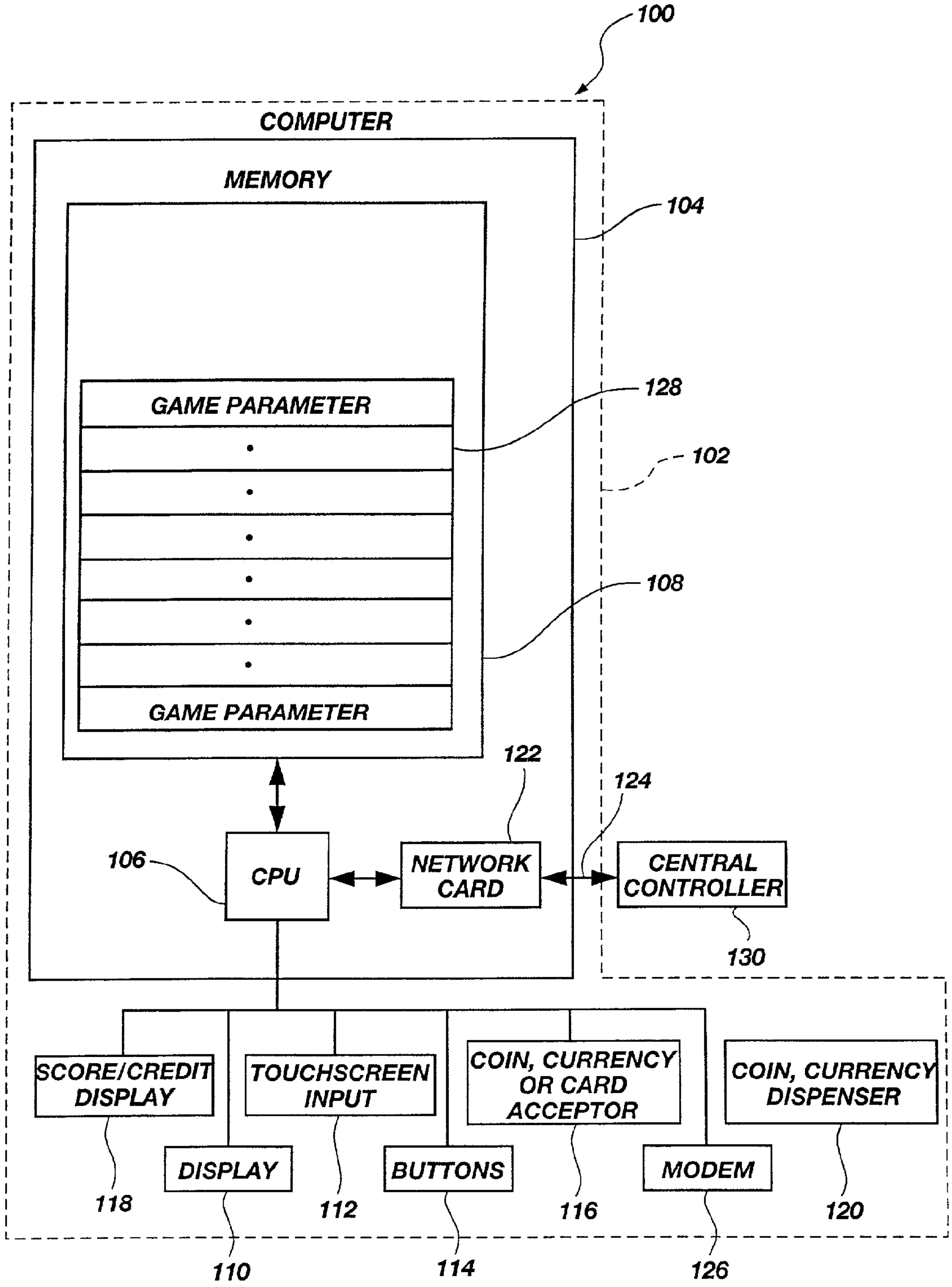
Fig. 1 (PRIOR ART)
FIG. 1 is a schematic of a conventional, prior art electronic gaming machine.

Referring to FIG. 2, an exemplary gaming device 200 used in conjunction with the present invention is shown. The gaming device 200 includes, a microprocessor or other computer 204 having a central processing unit (CPU) 206 and memory 208 which may serve, in part, as a random number generator. The computer may be coupled to a number of peripheral devices such as, by example only, one or more display screens 210 (e.g., a cathode ray tube (CRT), plasma display, liquid crystal display (LCD), and/or a display based on light emitting diodes (LED) or a combination thereof), possibly having a touchscreen input 212 for display of graphics associated with one or more games playable on gaming device 200. Buttons, keys or other user input devices 214 are also operably coupled to CPU 206 for initiating game play and for other functions associated with play of a game. The input devices 214 may include an interactive symbol controller 214A as shall be discussed in greater detail below.

Preferably a coin, currency or card acceptor device 216 (to accept a credit card, gaming card, smart card and the like) permits a player to enable play of a game by placing one or more wagers. The electronic game may also include a separate scoreboard display 218 to indicate a player's success, such as displaying the player's accumulated winnings. A coin and/or currency dispenser 220 may also be included, or a player's winnings credited back to him or her using the card acceptor 216.

The electronic game 200 may also be coupled to one or more other computers such as a central computer 230 of a casino, for example, via a network card 222 and link 224, modem 226 and the like for configuration and monitoring of the game 200 by the casino, or alternatively for interconnection of multiple gaming units 200 for tournament style gaming.

The game parameters 228, such as how, when and where particular images will appear on the display screen 210, how the game works and how to operate the various elements operably coupled to the computer 204, are stored in the memory 208. The electronic game 200 may be housed in a structural and/or decorative housing 202 (shown in broken lines) as is well known and understood by those of ordinary skill in the art.

Figure 2A:
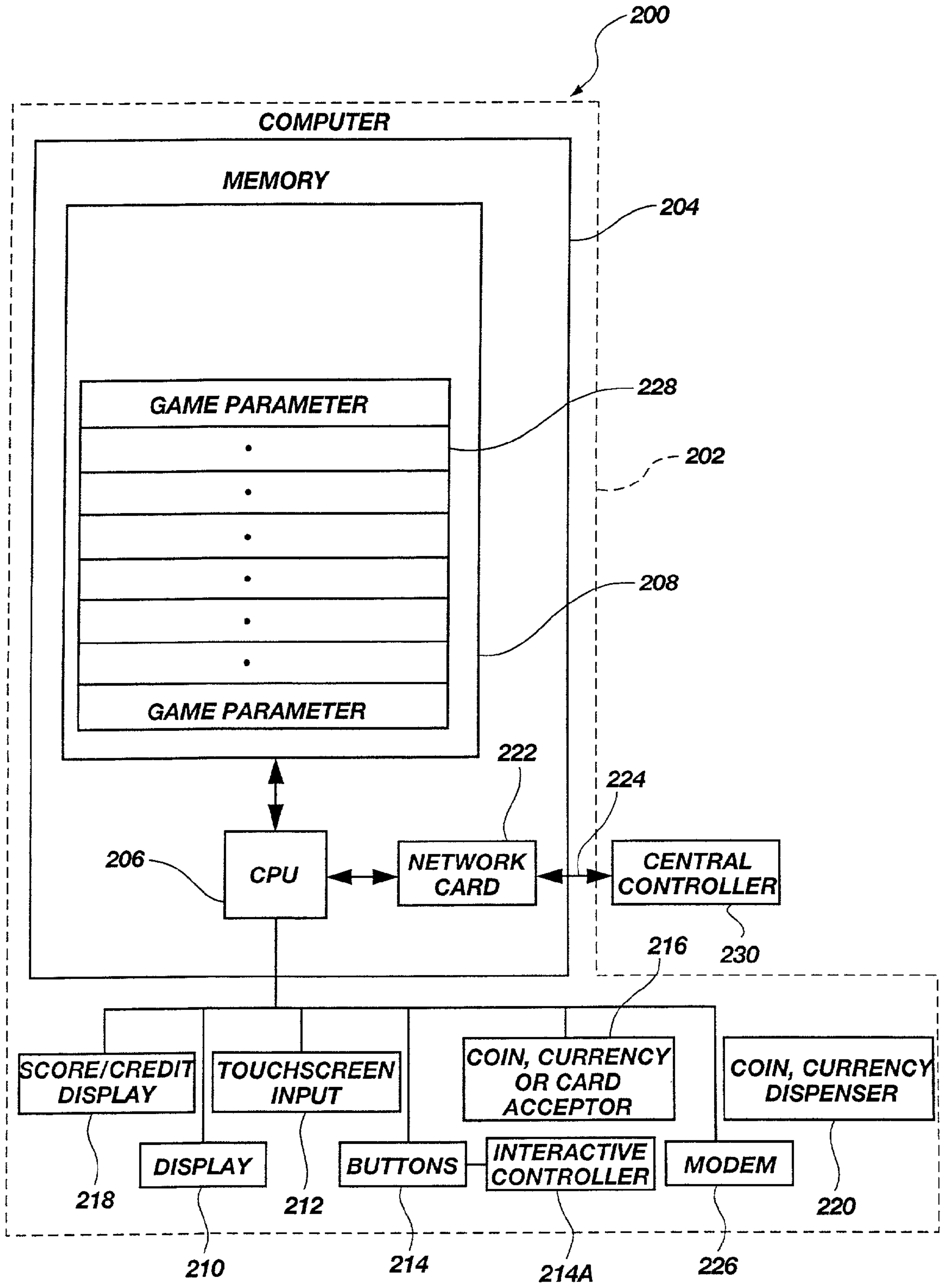
FIG. 2A is a schematic of an exemplary electronic gaming machine according to one embodiment of the present invention, with FIGS. 2B and 2C showing exemplary interactive controllers utilized with the electronic gaming machine.
Figure 2B:
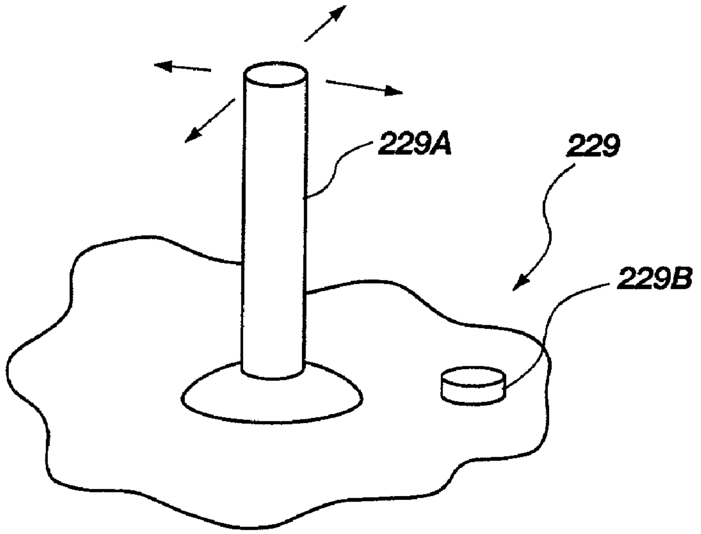
Figure 2C:
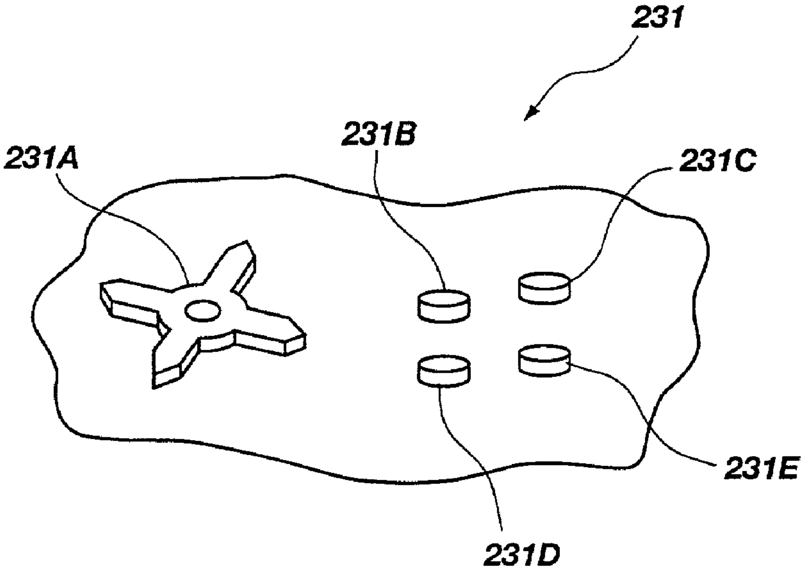

Referring to FIGS. 2A, 2B, and 2C, the interactive symbol controller 214A may include a game pad type device such as a joy stick 229 or other directional/control device 231 having individual input devices 229A and 229B and 231A through 231E respectively. The interactive symbol controller 214A may be used in various embodiments of the present invention, as set forth below, for stimulating interaction of various gaming symbols, such as, for example, perceived control of the orientation, motion or other action of an interactive gaming symbol. In an alternative embodiment, existing user input devices 214 may serve dual functions by also serving as the interactive symbol controllers 214A.

Figure 3A:
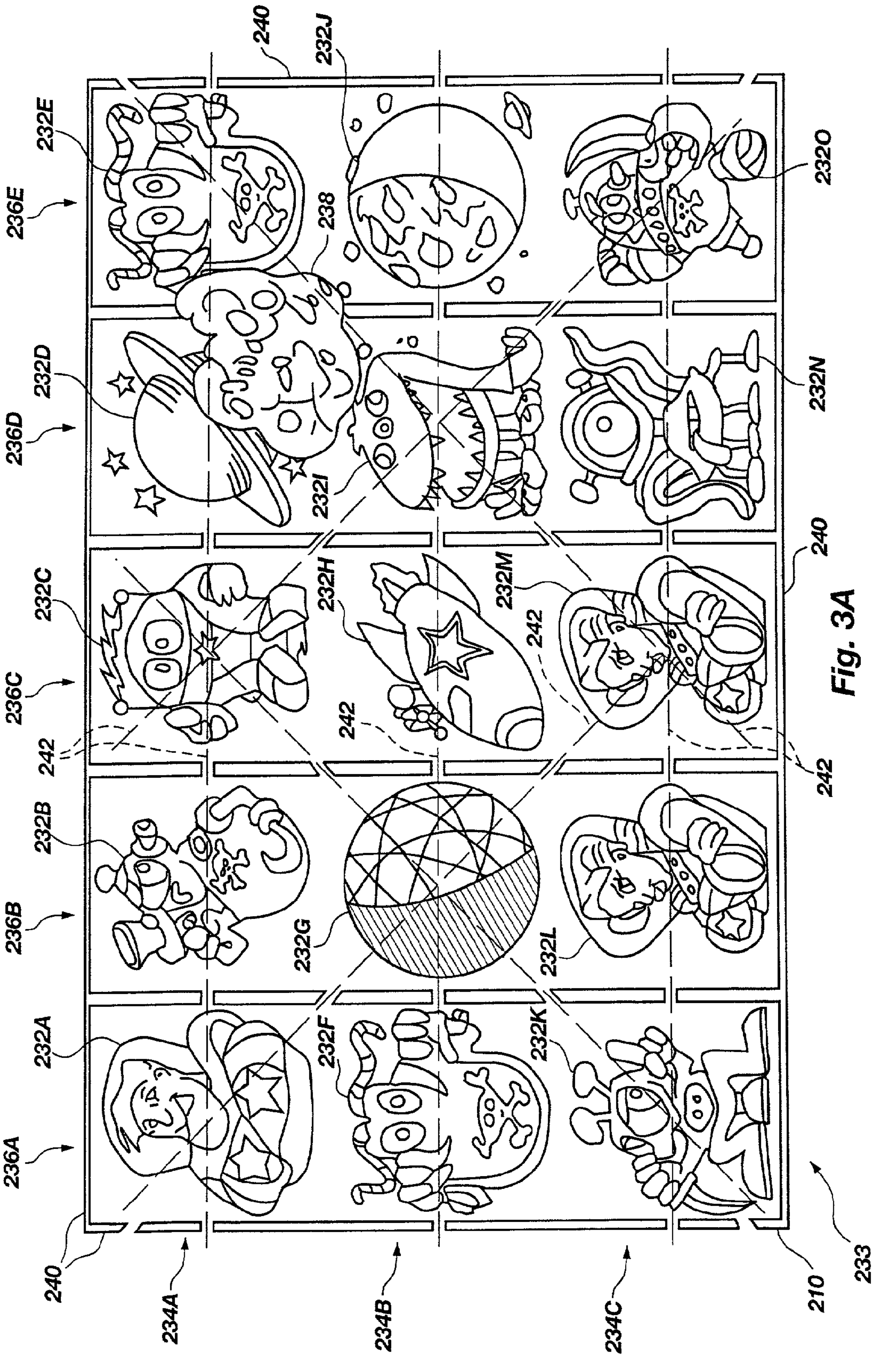
FIGS. 3A through 3D show a display screen with a gaming outcome including an interactive gaming symbol according to one embodiment of the present invention.

Referring to FIG. 3A, an initial game outcome 230 is shown on the display screen 210 of a gaming device 210 according to one embodiment of the present invention. The game outcome 230 includes a plurality of array symbols 232A-232O which may be arranged in one or more rows 234A-234C and one or more columns 236A-236E which columns represent, and will be referred to herein as reels. The array symbols 232A-232O are selected and positioned by random upon a player placing a wager and activating the gaming device 200.

In the particular embodiment shown in FIG. 3A, at least one additional symbol 238, referred to herein as a non-array symbol, or alternatively a symbol in a non-arrayed position, is shown. As indicated by its name, the non-array symbol 238 is not necessarily positioned in any particular location on the array of the game outcome 230 and is moveable about the display screen 210 and may even perceptibly move on and off of the display screen 210. Alternatively, the non-array symbol may continually move about the display screen perceptibly ricocheting off of the outer boundaries 240 of the display screen 210.

One or more paylines 242 (shown in broken lines) may also be associated with the plurality of array symbols 232A-232O to indicate potential payouts associated with the symbol array. Different paylines 242 may be associated with different levels of payouts and different levels of wagering as will be understood and appreciated by those of skill in the art.

In the game outcome 230, symbol 232H operates as an interactive symbol. The interactive symbol may interact with another symbol (either another array symbol, or anon-array symbol otherwise introduced onto the display screen 210) to produce a new outcome, to launch a second screen such as a bonus-type game, to win credits or otherwise potentially enhance the winnings associated with the game outcome 230 of the primary game.

In the embodiment shown in FIGS. 3A through 3D, the interactive symbol may be controlled by a player via the interactive symbol controller 214A for interaction with other symbols on the display screen 210, and in this particular embodiment, with the non-array symbol 238. Referring now to FIGS. 3A through 3D in sequential order, upon the occurrence of a gaming outcome (such as the game outcome 230 shown in FIG. 3A) which includes the display of the interactive symbol 232H, the non-array symbol 238 appears on the display screen 210. In the exemplary embodiment shown in FIGS. 3A through 3D, the non-array symbol 238 is shown as a meteor or an asteroid while the interactive symbol 238H is shown as a space ship. For convenience and ease of understanding, the following example will be discussed in terms of a space ship 232H and an asteroid 238.

Figure 3B:
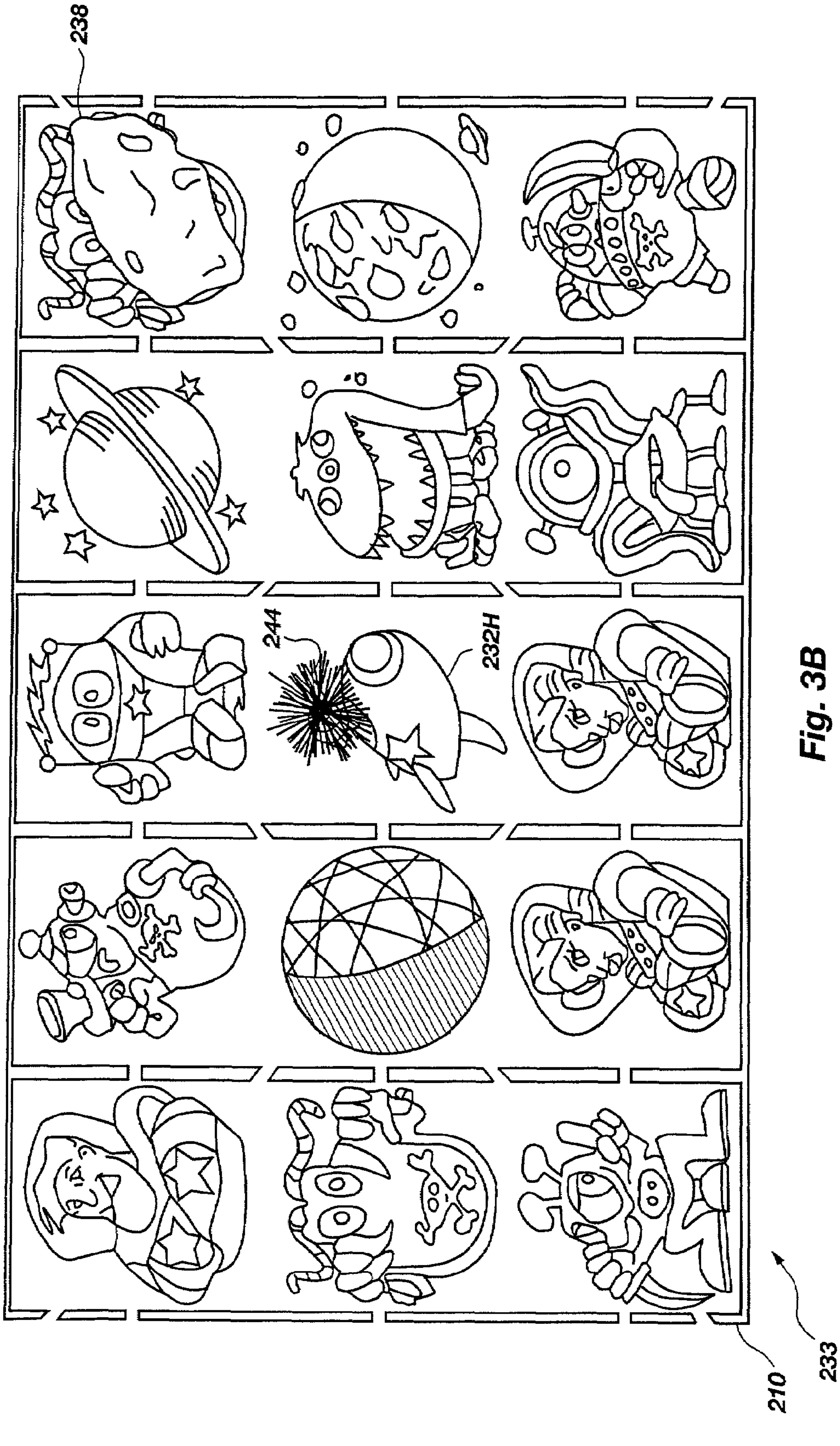
Figure 3C:
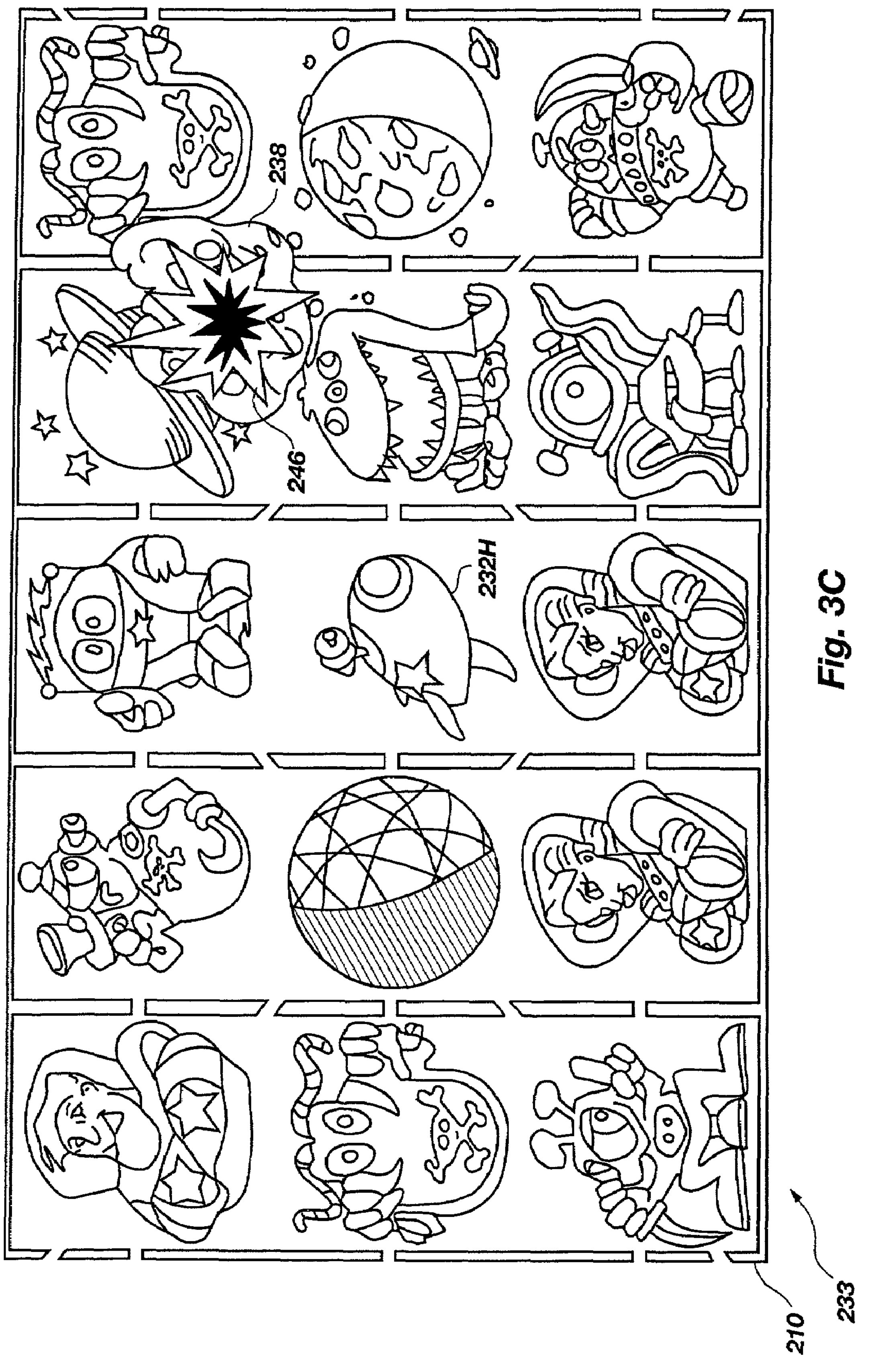
Figure 3D:
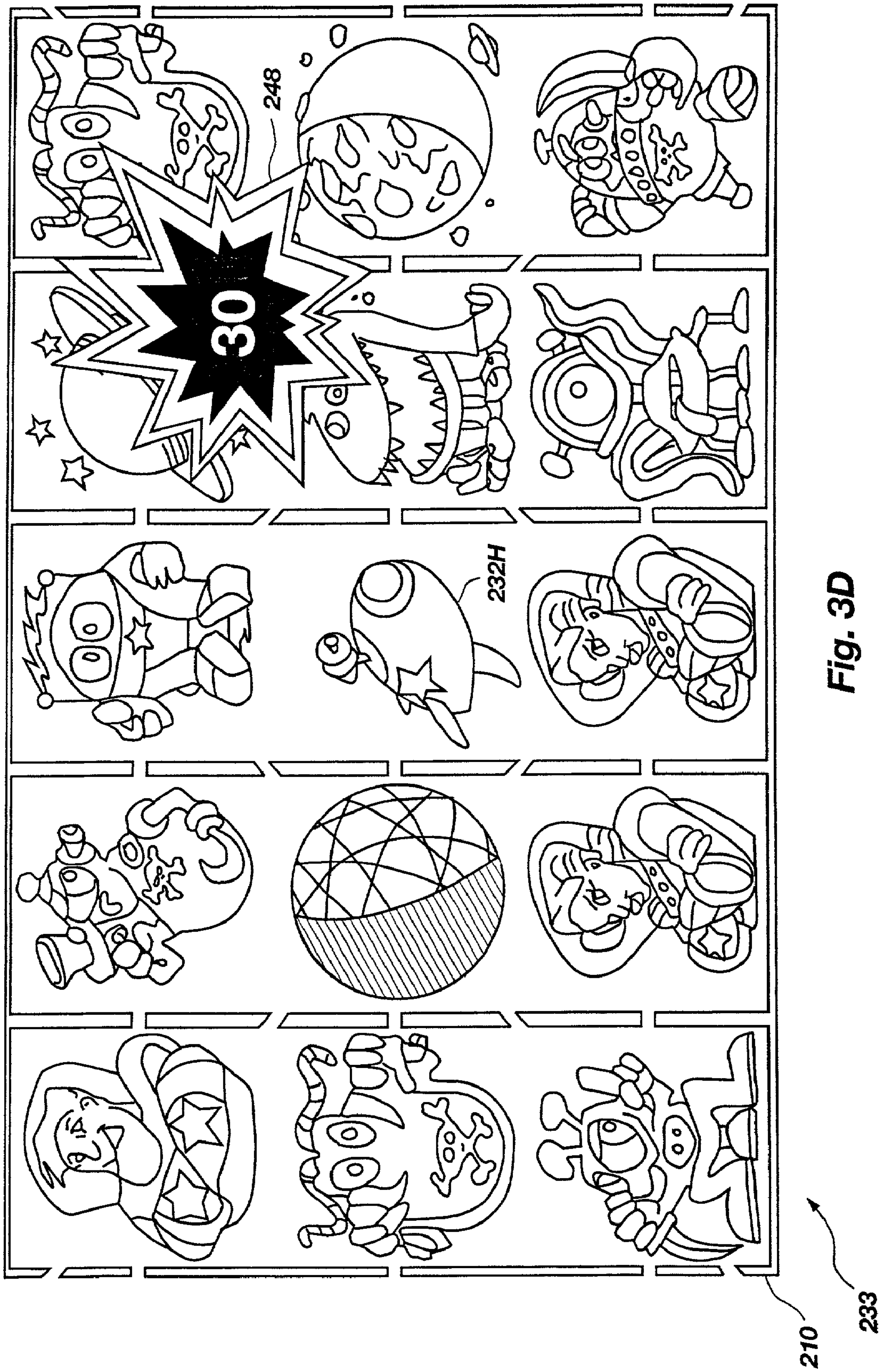

As the asteroid 238 moves about the display screen 210 a player may control the orientation of the space ship 232H through proper operation of an interactive symbol controller 214A such that the space ship 232H is directed toward the asteroid 238. The player may then fire a weapon 244 at the asteroid in an attempt to destroy it as shown in FIG. 3B. If the player has properly aimed and fired the weapon 244, a collision or explosion 246 will occur with the asteroid 238 as is seen in FIG. 3C. The explosion may destroy the asteroid 238 revealing an award 248 such as, for example, a multiplier or a specified number of credits as is shown in FIG. 3D. It is noted that the resultant award may be based upon random selection, or alternatively, may be based on other criteria such as, for example, how quickly the player was able to destroy the asteroid.

Additional asteroids 238, or other non-array symbols in different forms may also be displayed requiring the player to respond in a similar manner in an attempt to destroy them or otherwise interact with them. For example, a second, differently styled space ship may appear on the display screen and fire weapons at the interactive symbol 232H. In such a case, the player may have the option of activating a "shield" or attempting to maneuver out of the firing line to avoid being destroyed itself. The destruction of the interactive gaming symbol 232H may then carry associated penalties, such as a loss of credits wagered or loss of some or all of the winnings associated with the game outcome 230. It is noted that destruction of the interactive gaming symbol might occur in other ways as well, such as the asteroid or other non-array symbol 238 crashing into it.

It will be appreciated by those of ordinary skill in the art that other variations may be implemented and that the embodiment shown in FIGS. 3A through 3D is exemplary. For example, the interactive symbol 232H need not be a space ship, nor need the non-array symbol 238 be an asteroid. Additionally, the interactive symbol 232H may be configured to perceptibly move from its location within the array rather than being constrained to any particular position among the rows 234A through 234C or reels 236A through 236E. Another alternative may include the asteroids reducing in size upon being hit with a weapon 244 rather than disappearing. In such a case an award may be progressive, (i.e., the award growing in size each time the asteroid is reduced) or an award may be delayed until the asteroid is ultimately destroyed after a predetermined number of size reductions.

Also, various mechanisms may trigger the interactive mode of play. For example, the appearance of the interactive symbol 232H at any position on the array of the game outcome 230 may start the interactive mode of play. Alternatively, the interactive symbol 232H may appear numerous times before a non-array symbol 238 randomly appears and triggers the interactive mode. Additionally, initial criteria may be required in order to enable the possibility of interactive play. For example, an initial criteria might include the placement of a maximum wager. Thus, the interactive symbol may appear on the display screen 210 but not subsequently interact with any other symbols due the fact that enabling initial criteria, such as the placement of a maximum wager, has not been satisfied. Other initial criteria might include, for example, the placement of a predetermined wager greater than the minimum required wager but less than the maximum allowed wager, or a predetermined rate of wagering by the player.

Figure 4A:
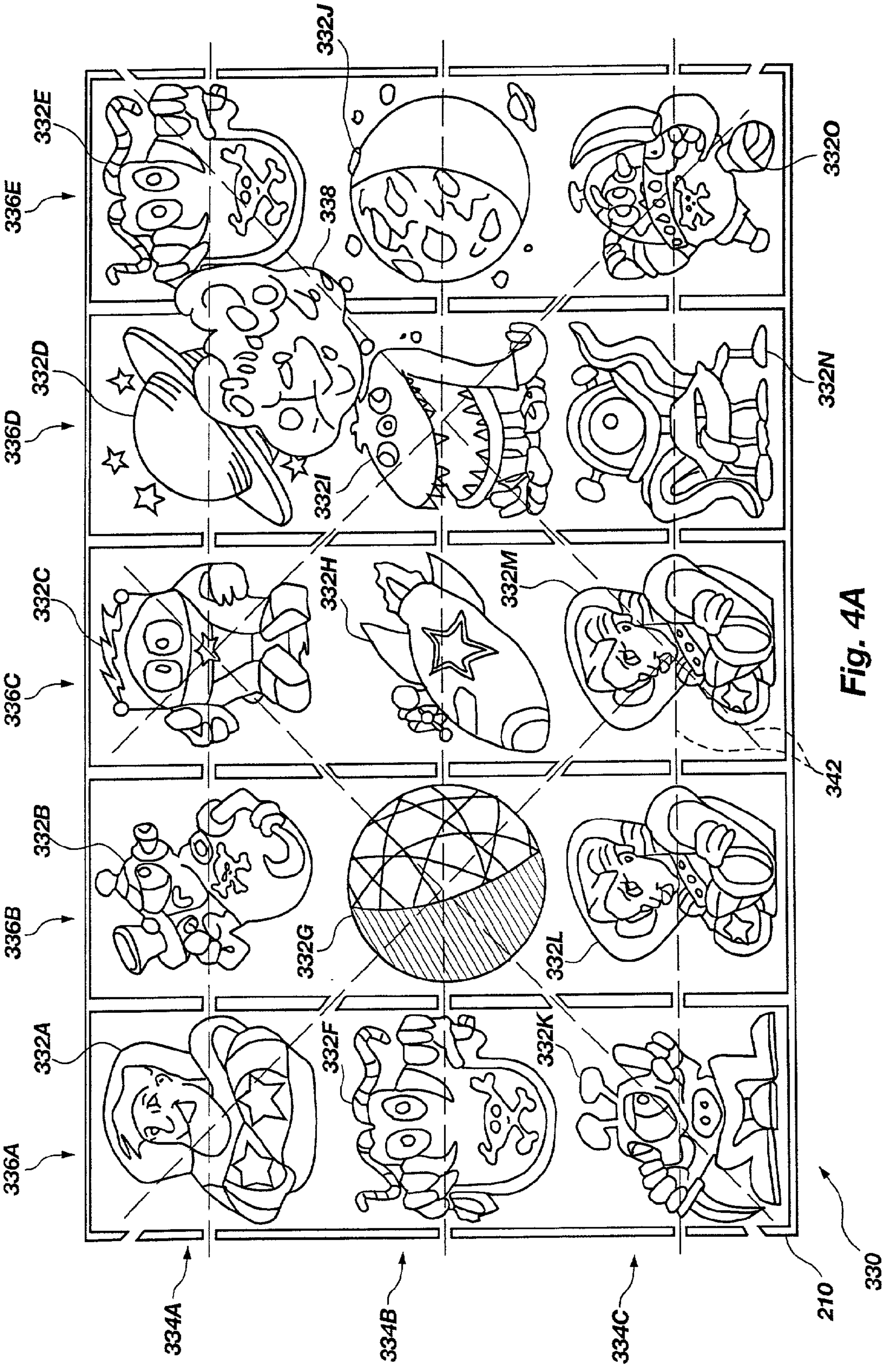
FIGS. 4A through 4C show a display screen with a gaming outcome according to another embodiment of the present invention, with FIG. 4D showing a variation of the embodiment.
Figure 4B:
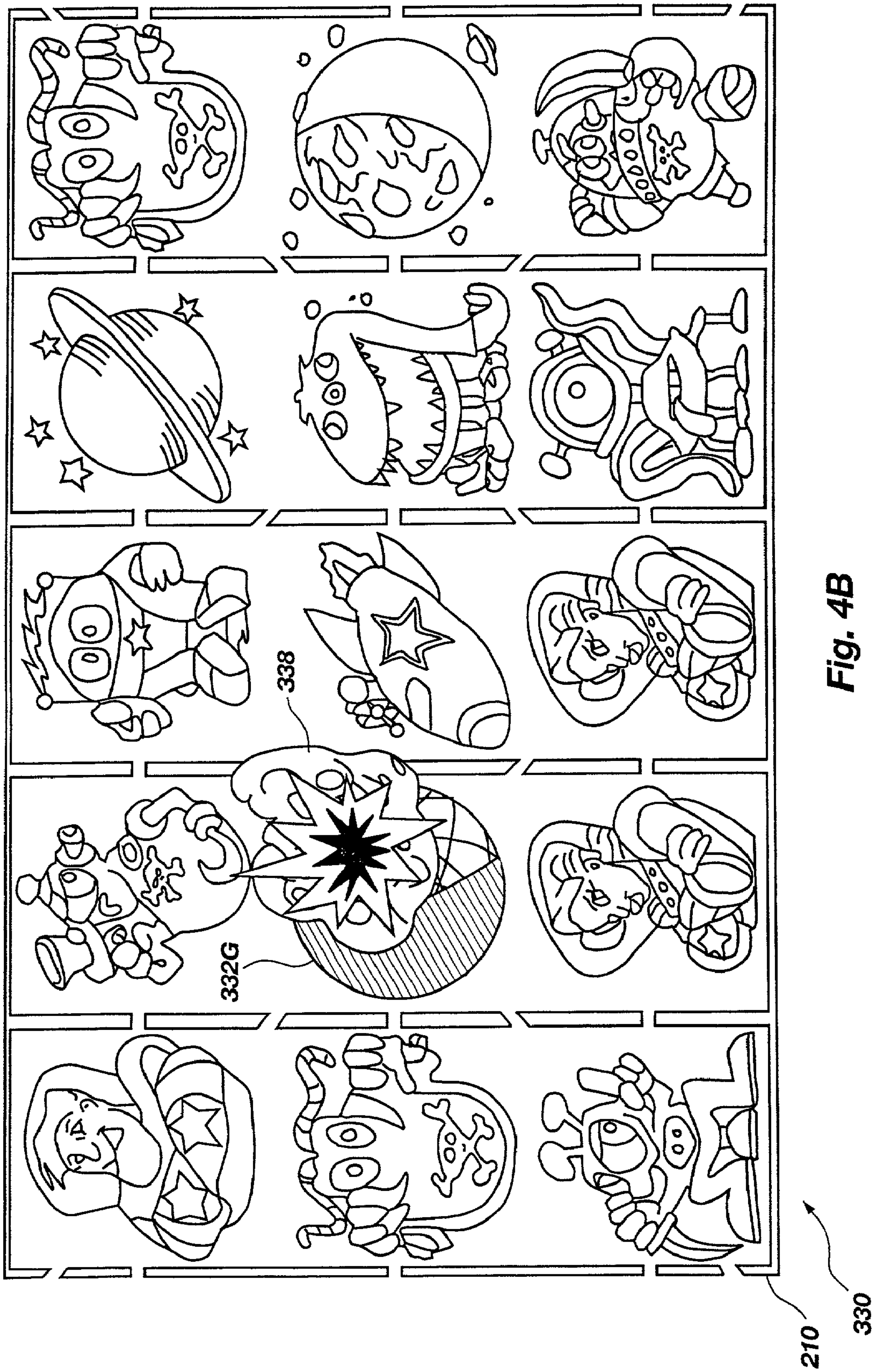
Figure 4C:
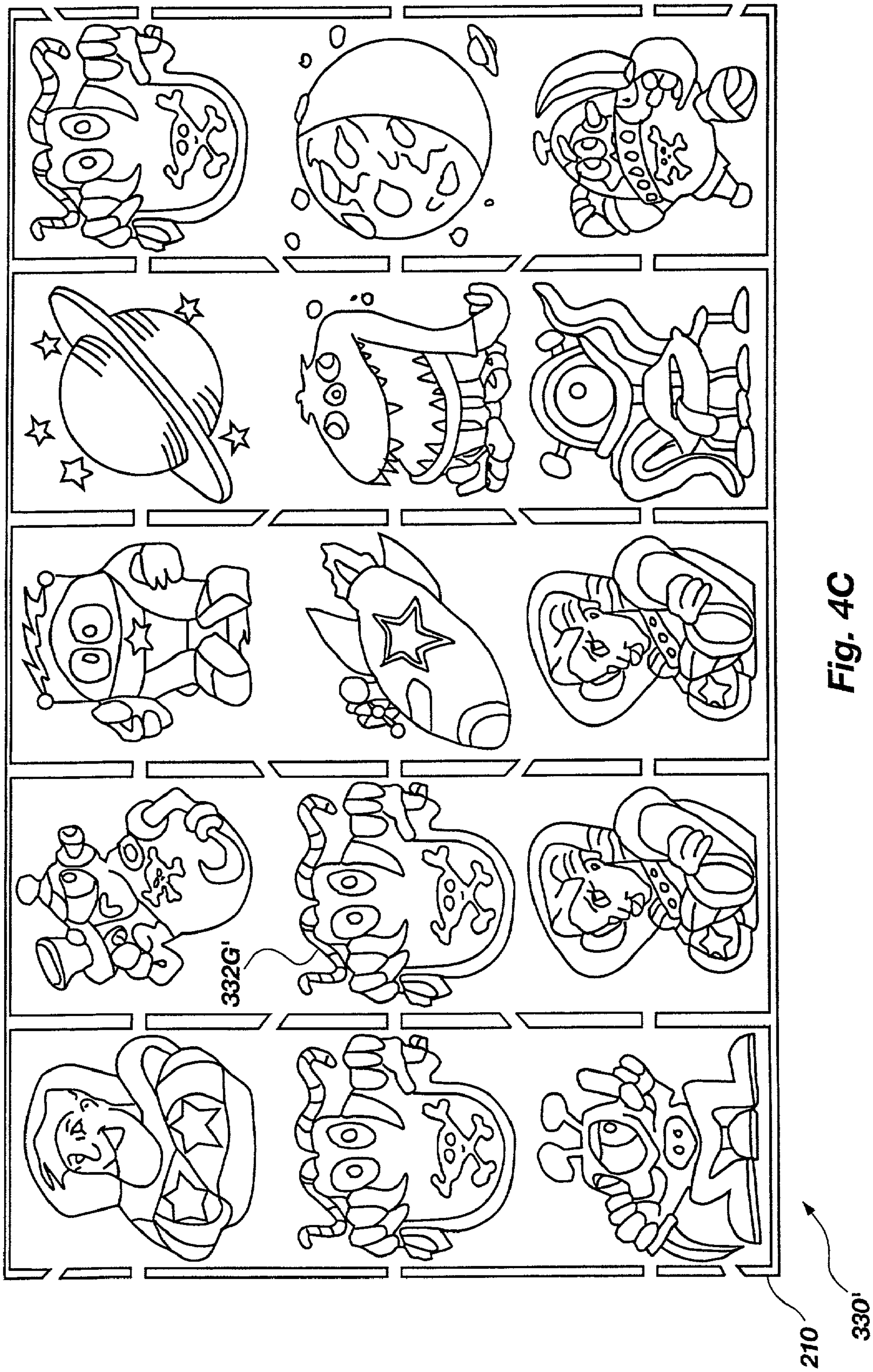

Referring to FIGS. 4A-4C, another embodiment of the present invention is shown. Similar to the embodiment discussed above with respect to FIGS. 3A-3D, a game outcome 330 is shown on the display screen 210. Again, the game outcome 330 includes a plurality of array symbols 332A-332O which may be arranged in one or more rows 334A-334C and one or more columns or reels 336A-336E. The array symbols 332 may be randomly selected and positioned upon placement of a wager and activation of the gaming device 200 by a player. At least one additional symbol 338, referred to herein as a non-array symbol, is also on the display screen and may move thereabout. One or more paylines 342 (shown in broken lines) may also be associated with the plurality of array symbols 332A-332O to indicate potential payouts.

In the embodiment shown in FIGS. 4A-4C, the interactive symbol is the non-array symbol 338. The interactive symbol 338 may appear in response to various triggering events, such as, for example, the display of a specified symbol, the placement of a predetermined wager, or some other triggering event. The interactive symbol 338 may perceptibly move across the display screen 210 until it interacts with another symbol 332A-332O. For example, the interactive symbol may be an asteroid (as shown) which may perceptibly move across the screen until it "collides" with a specified type of array symbol 332A-332O such as the planet as is shown in FIG. 4B. Upon such interaction, the array symbol 332G may become a new type of array symbol 332G' (e.g., a different planet, or any other available symbol) as seen in FIG. 4C, thus altering the outcome of any paylines 342 with which that particular array symbol 332G' is associated.

Figure 4D:
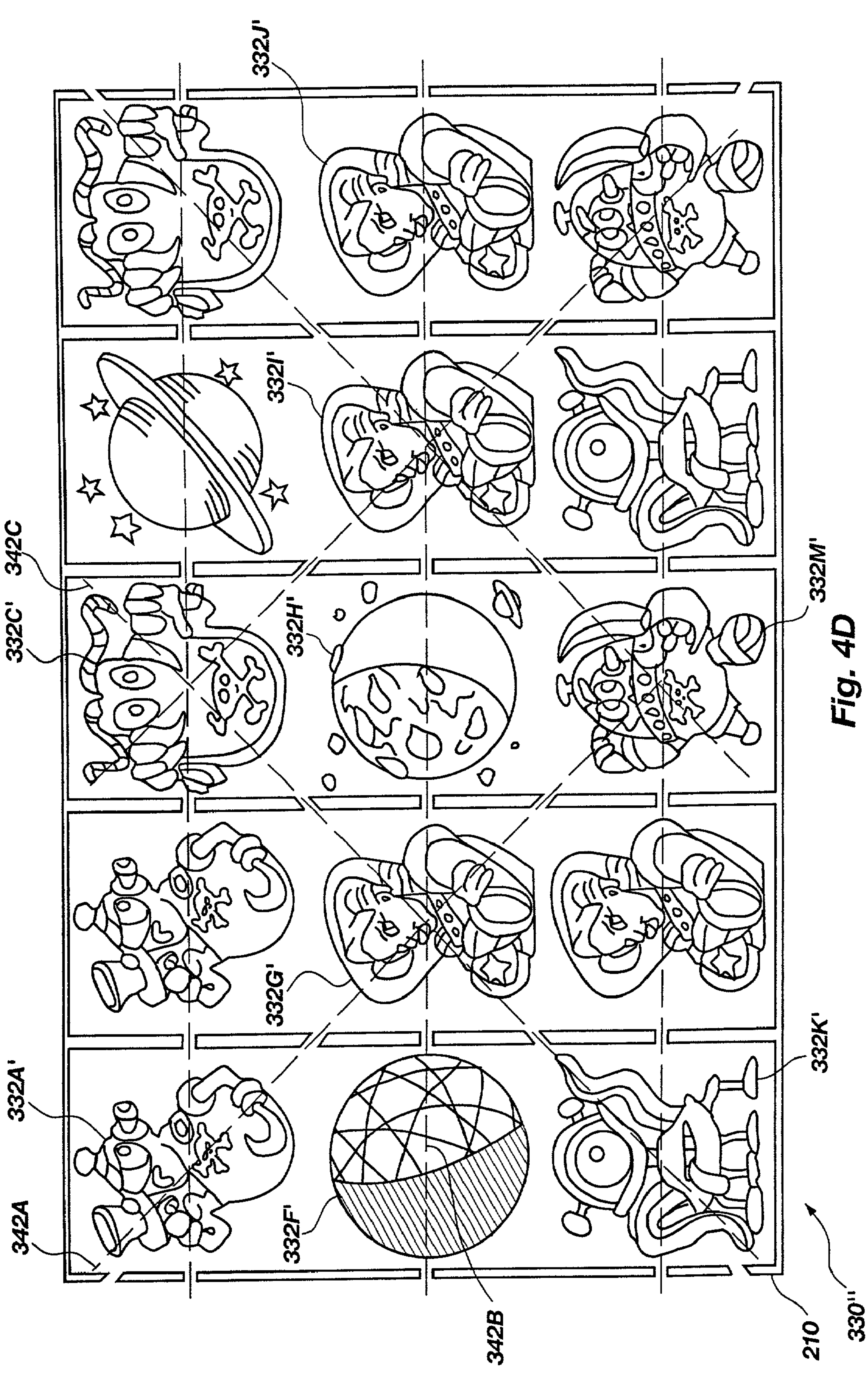

Alternatively, upon interaction of the interactive symbol 338 with a particular array symbol 332G, each array symbol located on a payline 342 associated with the particular array symbol 332G may be altered and changed to a new array symbol. Thus, as seen in FIG. 4D, array symbols 332A', 332C', 332F'-332J', 332K' and 332M' would be replaced with new array symbols altering the payout on the associated paylines 342A-342C and providing a new game outcome 330".

The particular array symbol chosen for interaction with the interactive symbol 338 (in this case array symbol 332G) may be selected at random Alternatively, the particular array symbol (i.e., 332G) may be selected by player choice, or may be initially random with player influence factoring into the ultimate selection. For example, in a combination of the embodiments of FIGS. 3A-3D and FIGS. 4A-4D, the rocket ship shown as array symbol 332G may also be interactive such that a player may "steer" the asteroid (i.e., interactive symbol 338) in a particular direction by shooting at it and causing a course adjustment. Upon contact with an array symbol selected by the player, a secondary weapon may be fired to cause interaction between the asteroid 338 and the selected array symbol with results similar to those described above. Further, symbols such as planets might perceptibly exhibit a "gravitational effect" on the asteroid 338 to further combine randomness with the player control.

Figure 5A:
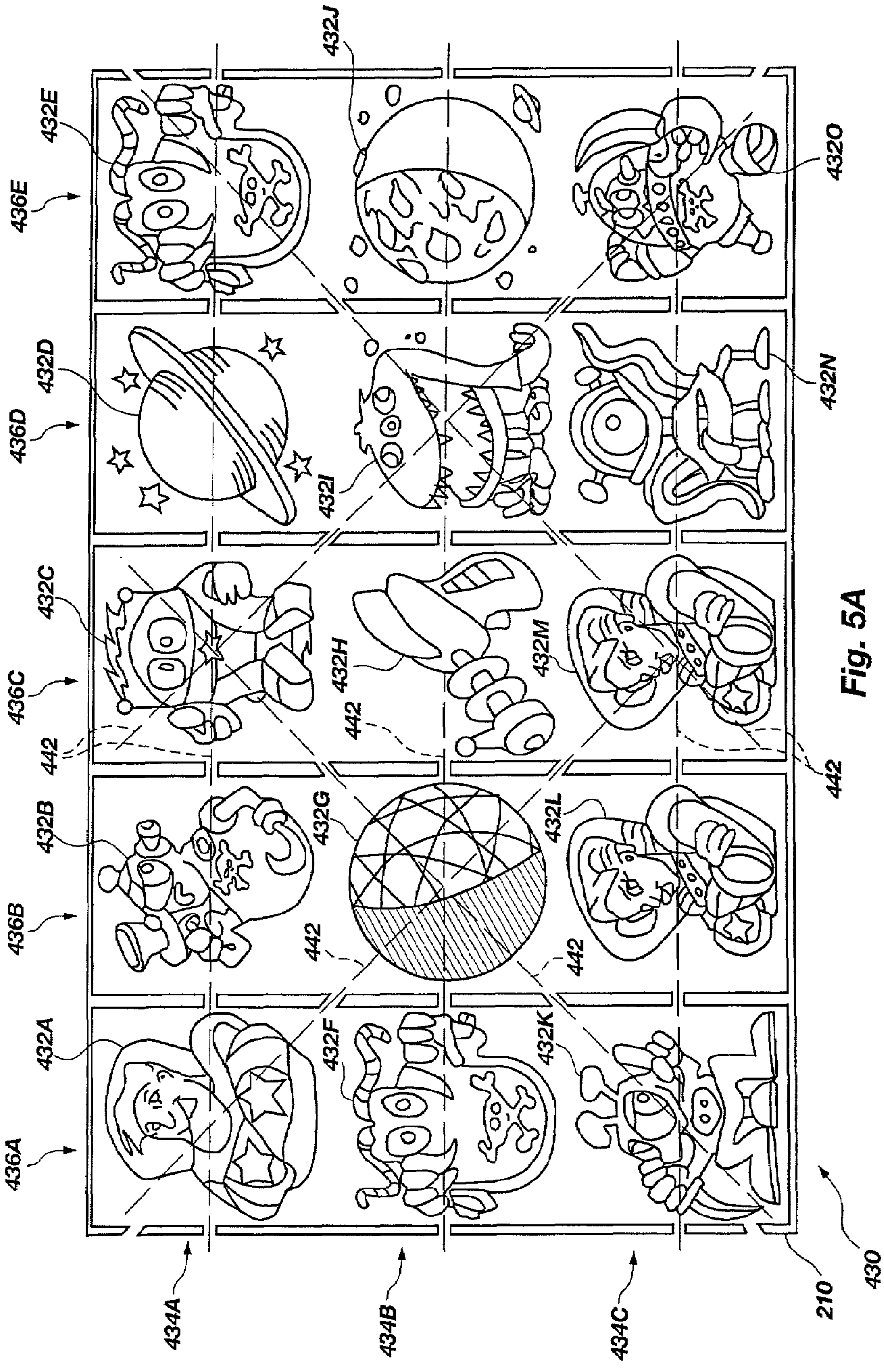
FIGS. 5A through 5D show a display screen with a gaming outcome according to another embodiment of the present invention, with FIGS. 5E through 5G showing a variation of the embodiment.

Referring now to FIGS. 5A through 5D, another embodiment of the present invention is disclosed. FIG. 5A shows a game outcome 430 on a display screen 210 which includes a plurality of array symbols 432A-432O which may be arranged in one or more rows 434A-434C and one or more columns or reels 436A-436E. The array symbols 432A-432O are randomly selected and positioned upon placement of a wager and activation of the gaming device 200 by a player. One or more paylines 442 (shown in broken lines) may also be associated with the plurality of array symbols 432A-432O to indicate potential payouts. One of the array symbols 432A-432O serves as an interactive symbol 432H.

Figure 5B:
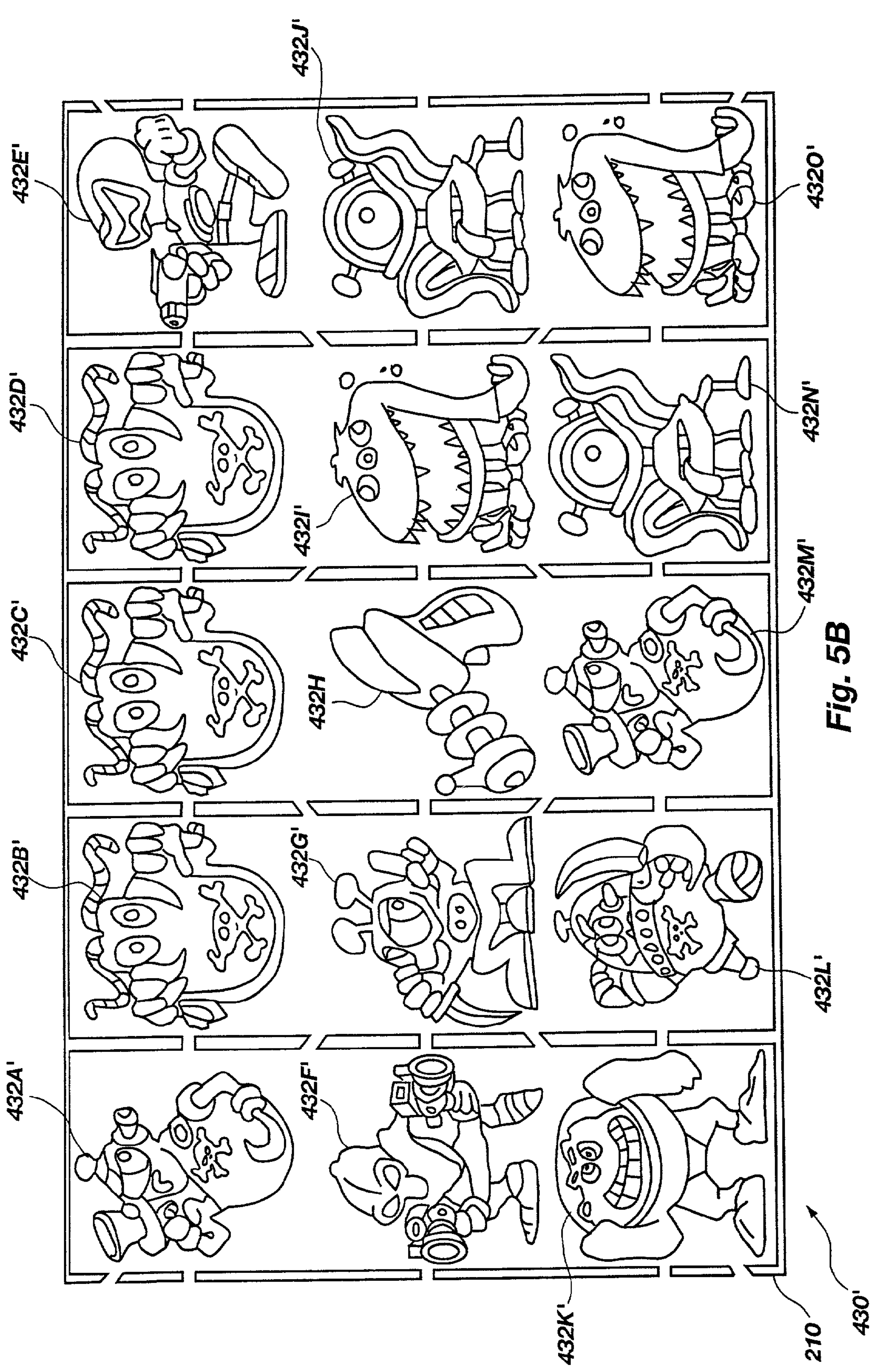

Upon the appearance of the interactive symbol 432H at a specified location, or alternatively at any location on the array of the game outcome 430, each of the other array symbols 432A-432G and 432I-432O then change to become new symbols 432A'-432G' and 432I'-432O' as seen in FIG. 5B. The changing of each array symbol, less the interactive symbol 432H, has the effect of changing the payout associated with each payline 442 effectively creating a new game outcome 430'. After the new game outcome 430' is displayed, the interactive symbol may interact with one of the new array symbols 432A'-432G' and 432I'-432O' either through random selection, or by player selection such as, for example, by a player touching the desired array symbol on a touch screen or otherwise initiating interaction.

Figure 5C:
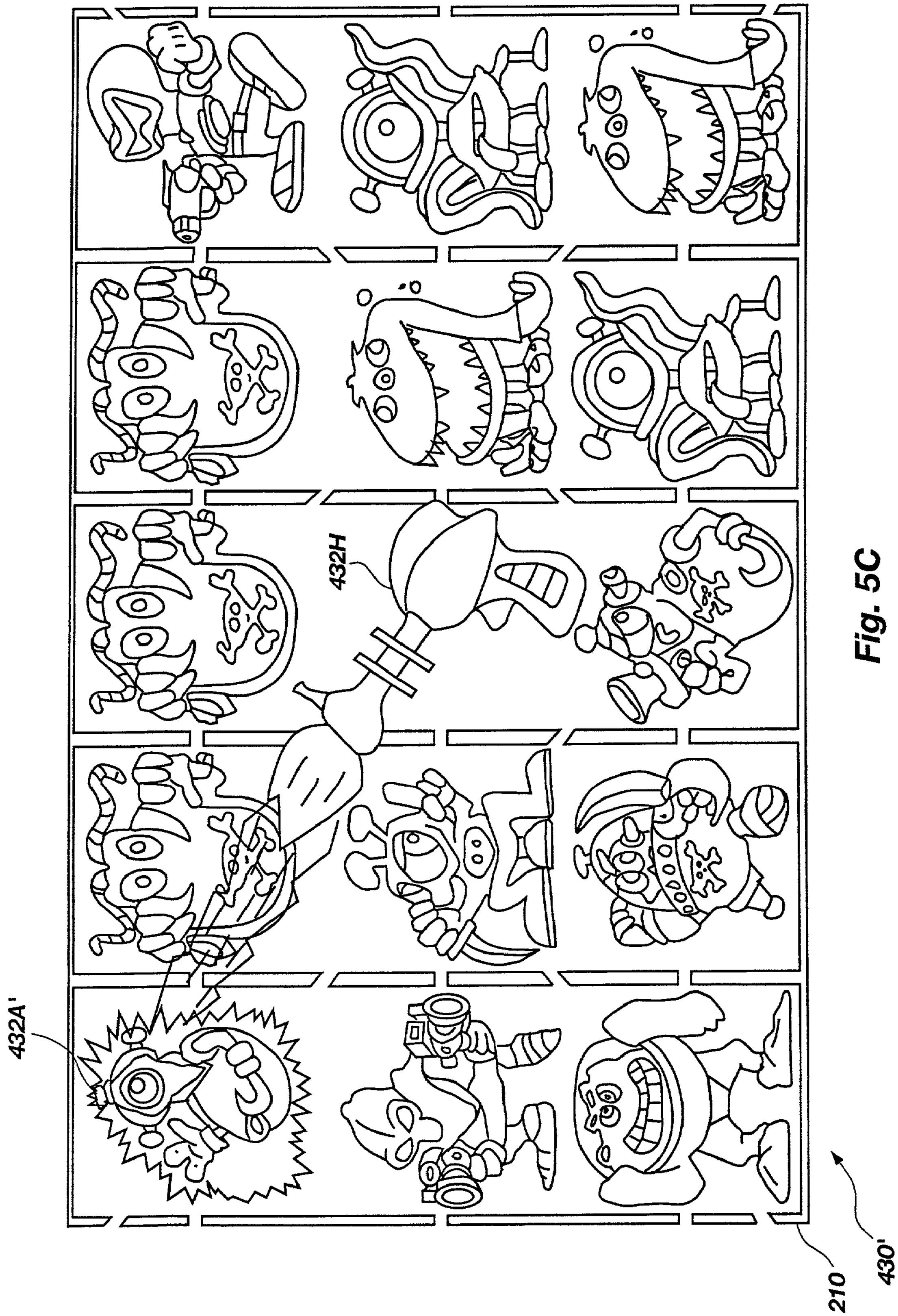
Figure 5D:
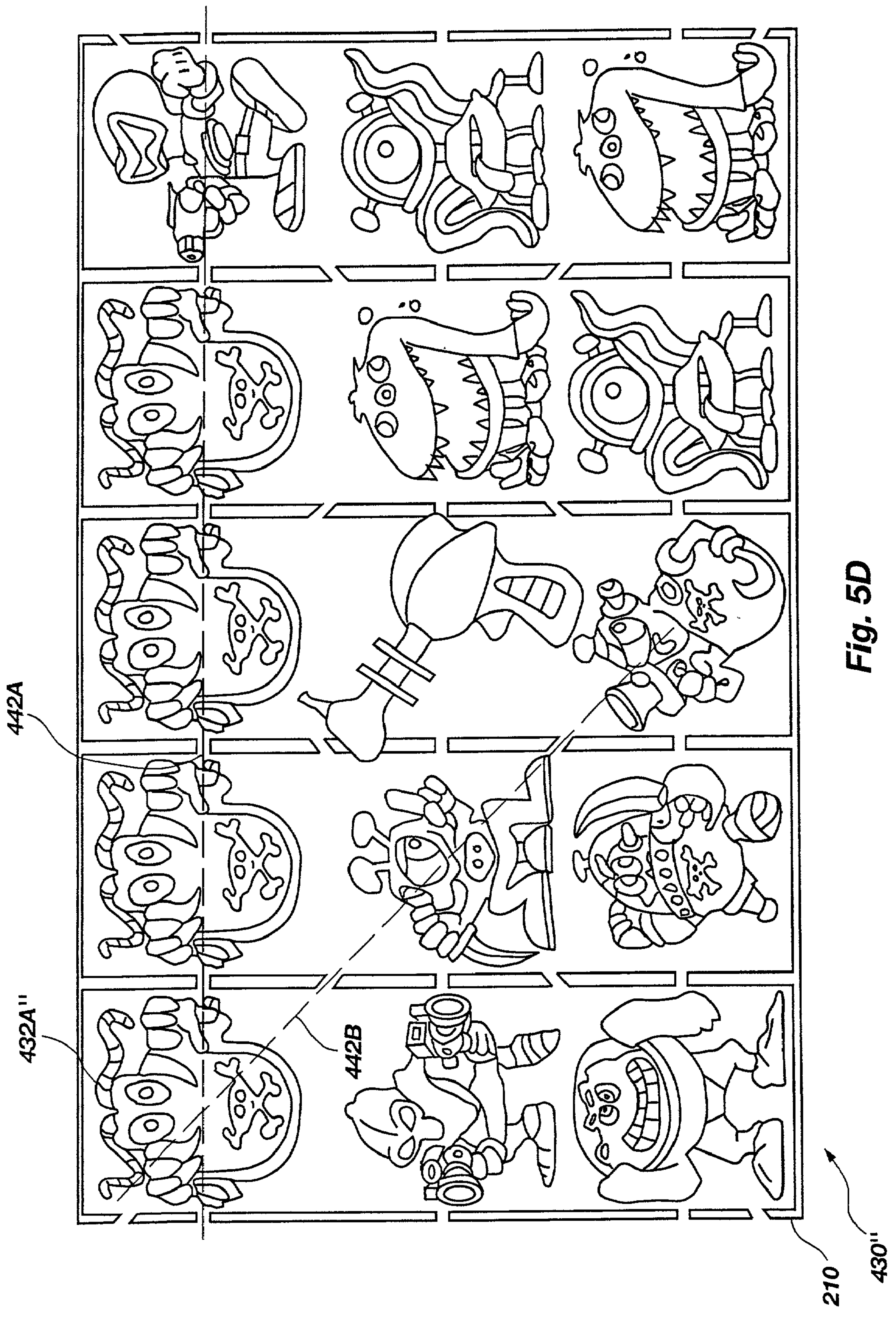

Using array symbol 432A' as an example, upon selection of a particular array symbol 432A' the interactive symbol 432H perceptibly interacts with the selected array symbol 432A' as is seen in FIG. 5C. The perceived interaction between the interactive symbol 432H and the selected array symbol 432A' results in the transformation of the selected array symbol 432A' to a new array symbol 432A" as seen in FIG. 5D. The new symbol thus creates a new outcome with respect to any paylines 442A and 442B with which it is associated. Thus, looking at the example shown in FIG. 5D, paylines 442A and 442B are affected by the transformation and appearance of the new array symbol 442A" thus creating another new game outcome 430".

If so desired, a player might be provided with the opportunity of choosing whether to keep an original or intermediate game outcome 430 and 430', or to proceed to the final game outcome 430". In such a scenario, a player may view the first game outcome 430 of FIG. 5A and then choose whether the payouts associated therewith were satisfactory. If such payouts were satisfactory, the player could then collect such payouts. Alternatively, if the payouts were not deemed satisfactory to the player, the player may choose to proceed in having all array symbols replaced, less the interactive symbol 432H, as was described with reference to the intermediate game outcome 430' of FIG. 5B. Similarly, once the intermediate game outcome 430' was displayed, the player might again have the opportunity to choose whether that game outcome 430' was satisfactory, or whether to proceed with the transformation with one of the array symbols through perceived interaction with the interactive gaming symbol 432H.

Figure 5E:
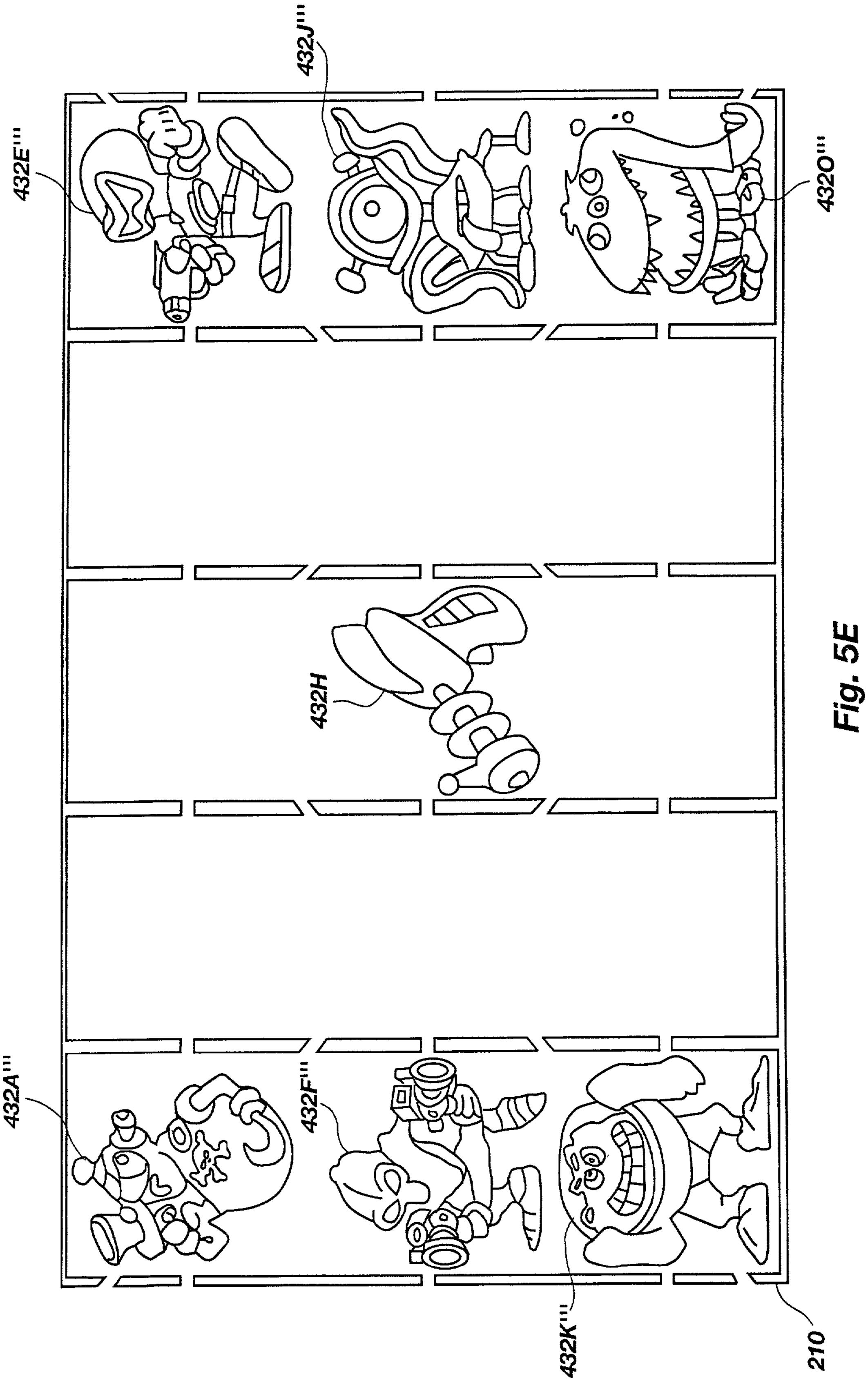
Figure 5F:
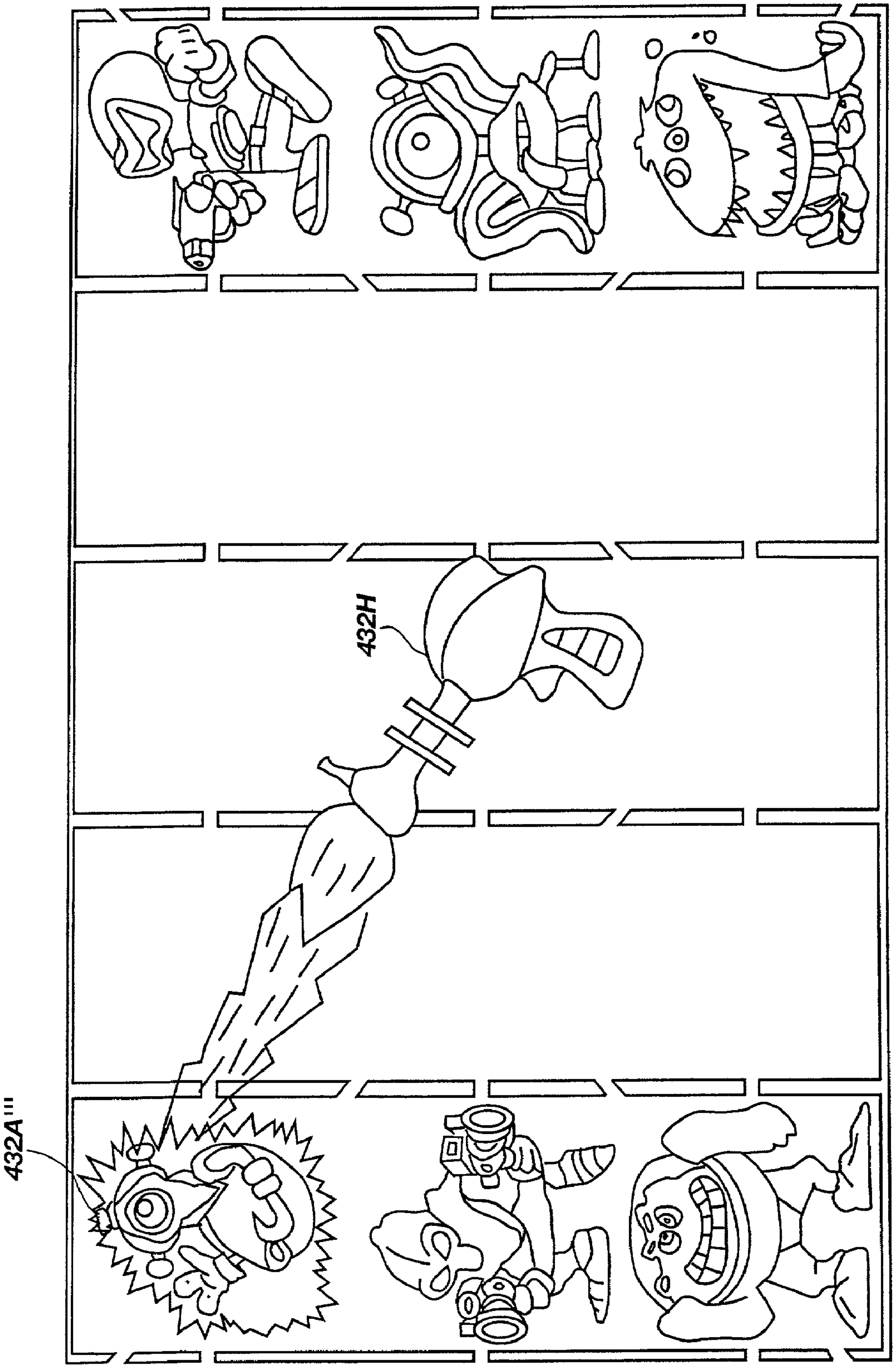
Figure 5G:
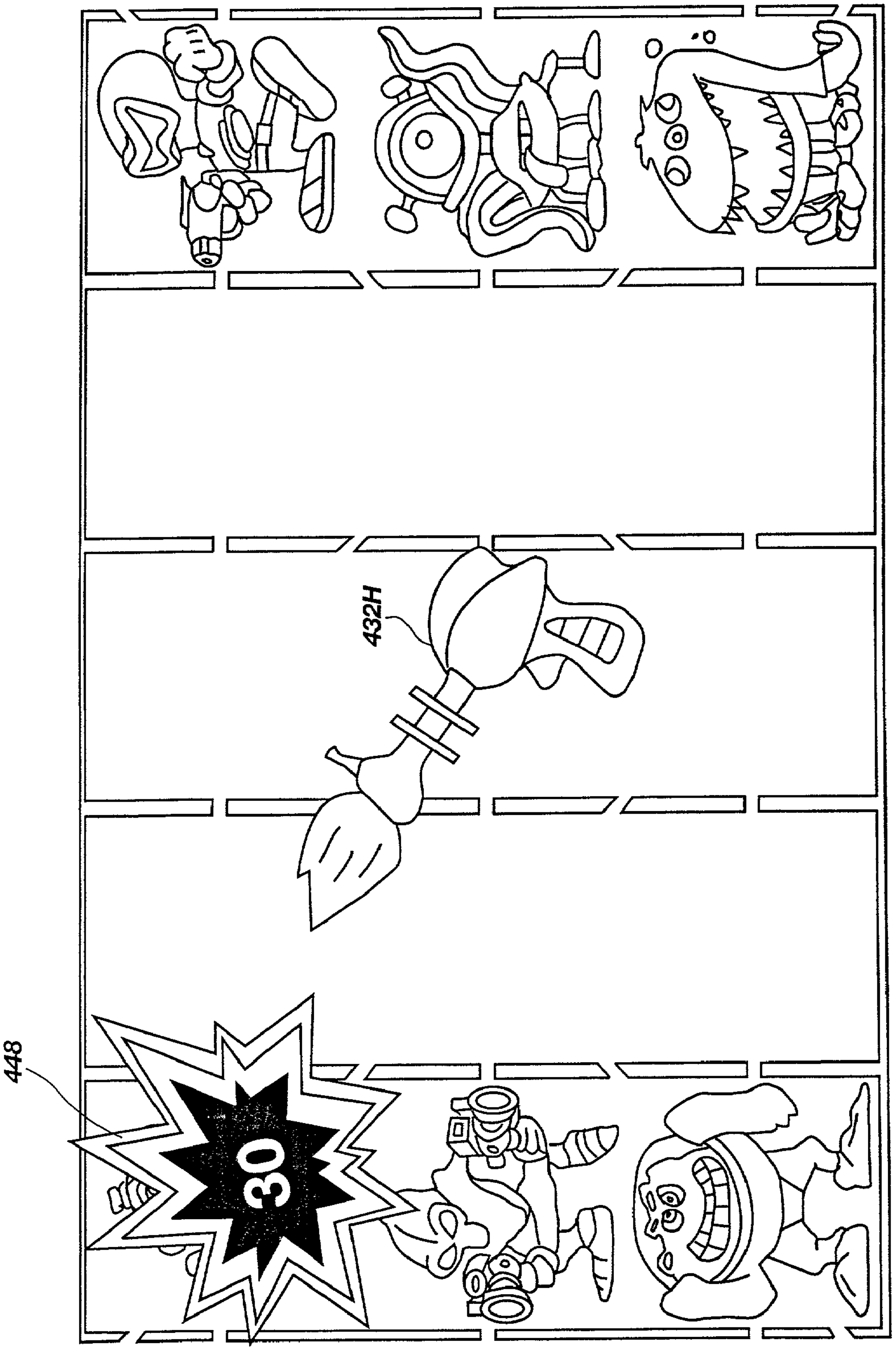

A variation of the embodiment disclosed in FIGS. 5A through 5D may be seen with reference to FIGS. 5E through 5G. In this variation, upon the appearance of the interactive symbol 432H (such as in FIG. 5A), all of the other array symbols 432A-432G and 432I-432O disappear and a predetermined number of new array symbols 432A'", 432E'", 432F'", 432J'", 432K'" and 432O'" appear in predetermined locations as shown in FIG. 5E. It is noted that the number of new symbols and the locations thereof as shown in FIG. 5E is exemplary and other configurations may be utilized. Upon the appearance of the new array symbols, a player may select one for perceived interaction with the interactive symbol 432H. Thus, as seen in FIG. 5F, a player may select new array symbol 432A'" upon which selection the interactive symbol 432H perceptibly interacts therewith to reveal an award 448 such as a specified number of credits, or a multiplier (e.g., 2X, 3X, etc.) used in multiplying the payout associated with the primary game outcome 430 as is shown in FIG. 5A.

Turning now to FIGS. 6A through 6E, another embodiment of the present invention is disclosed. A game outcome 530 is shown on the display screen 210 of a gaming machine 200. The game outcome 530 includes a plurality of array symbols 532A-532O which may be arranged in one or more rows 534A-534C and one or more columns or reels 536A-536E. The array symbols 532A-532O are randomly selected and positioned upon a placement of a wager and activation of the gaming device 200 by a player. One or more paylines 542 (shown in broken lines) may also be associated with the plurality of array symbols 532A-532O to indicate potential payouts. One of the array symbols 532A-532O includes an interactive symbol 532H.

Figure 6A:
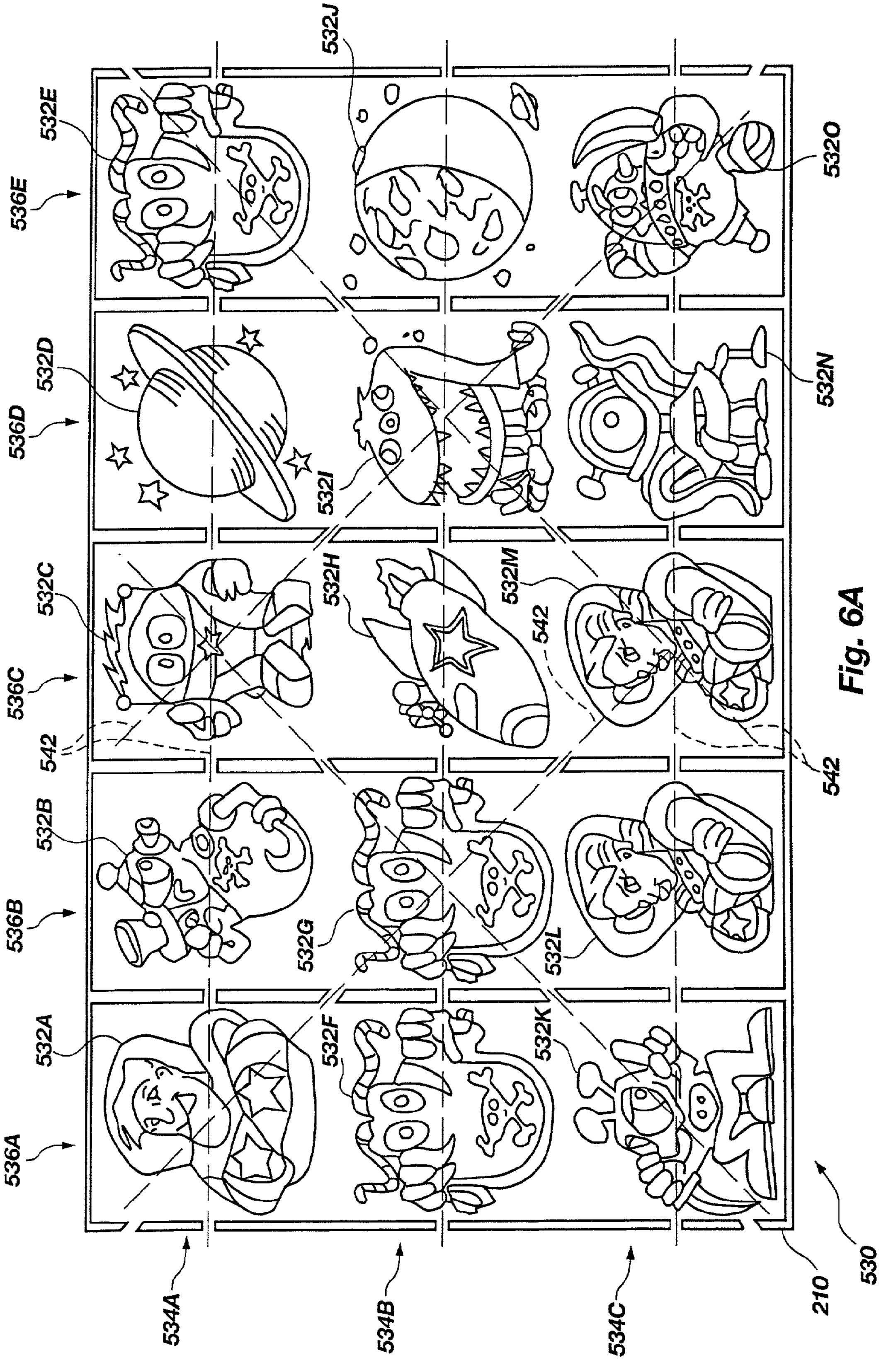
FIGS. 6A through 6E show a display screen with a gaming outcome according to yet another embodiment of the present invention.
Figure 6B:
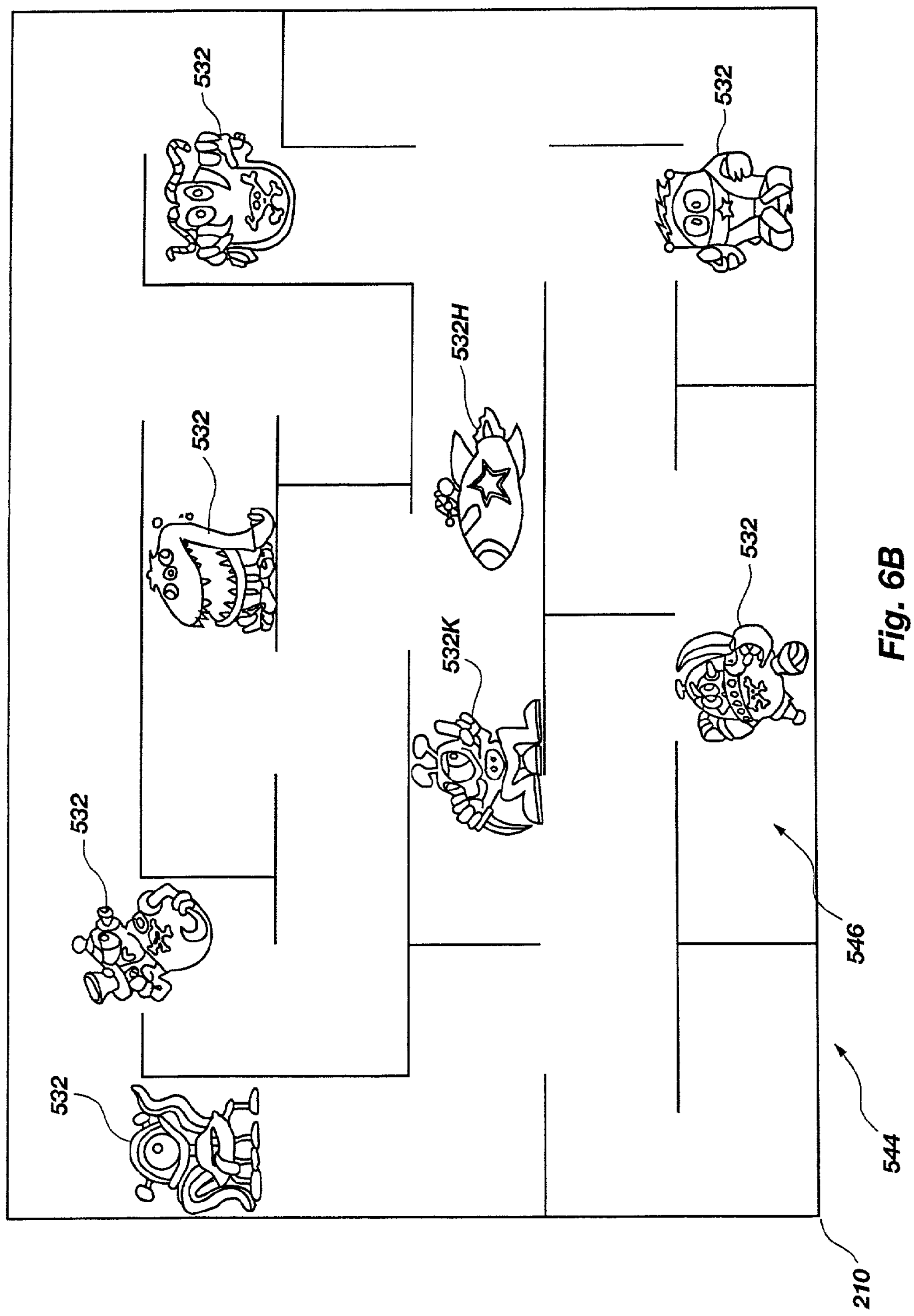
Figure 6C:
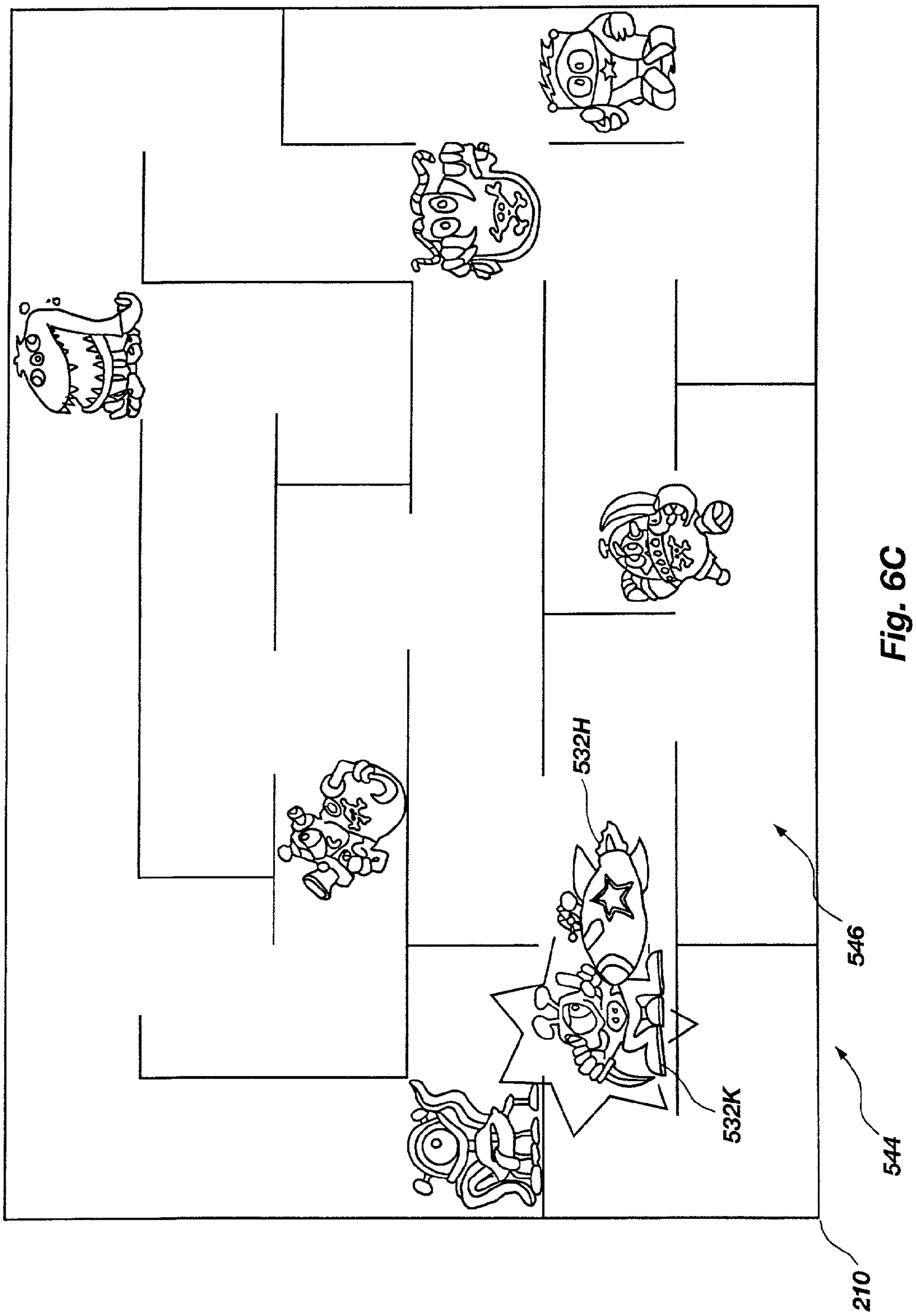
Figure 6D:
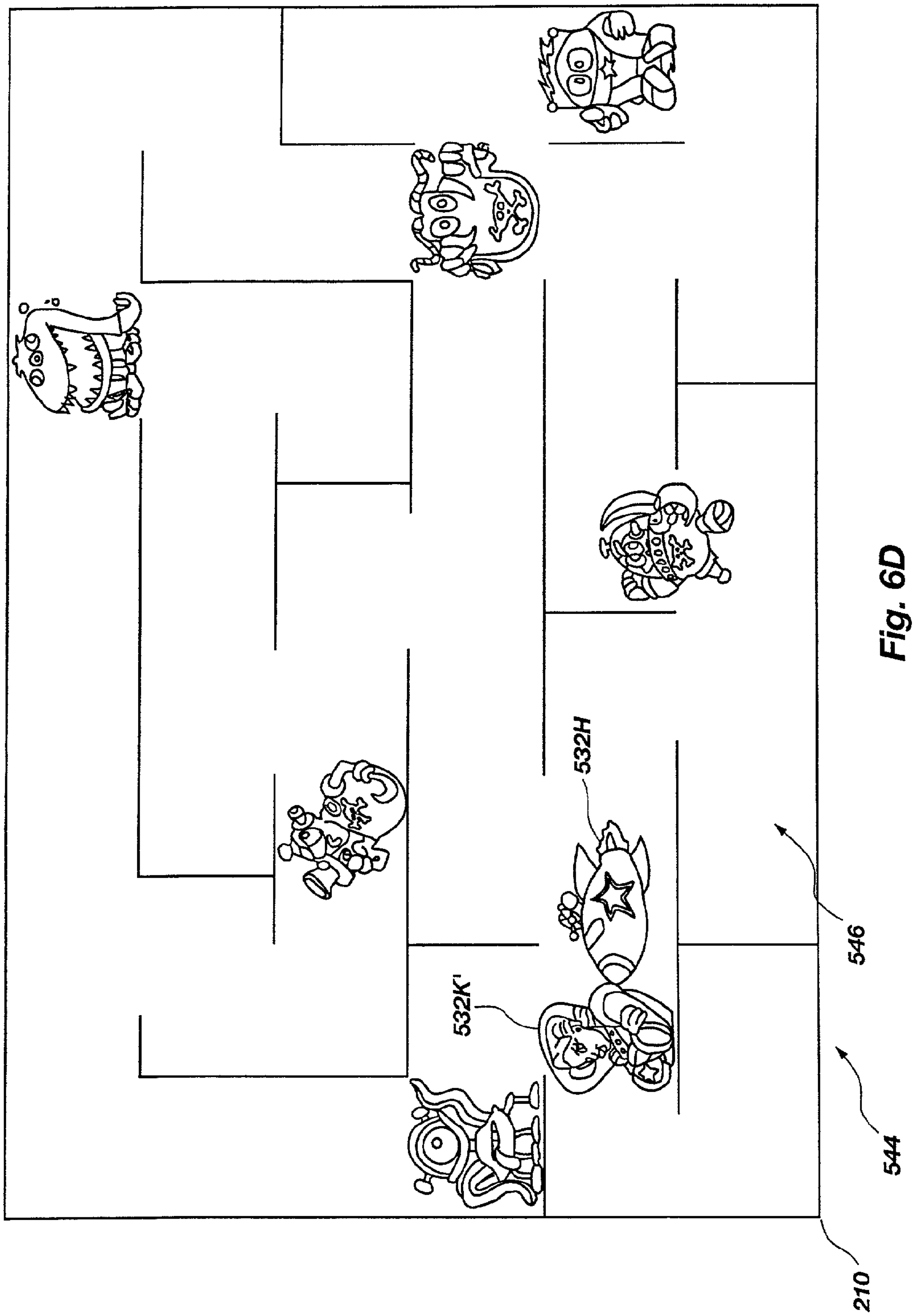
Figure 6E:
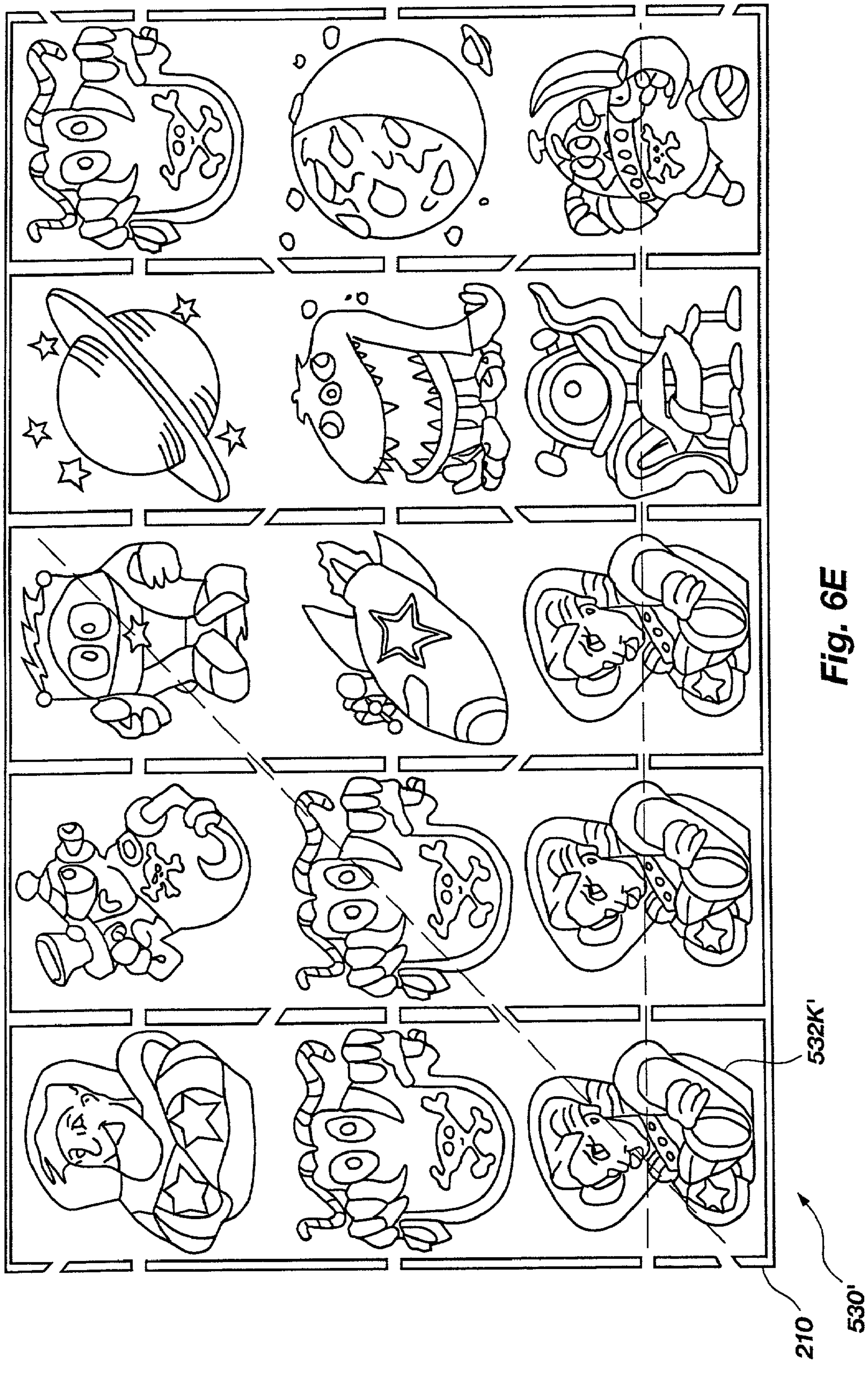

Upon the appearance of the interactive symbol 532H in the game outcome 530, or alternatively, upon the appearance of the interactive symbol 532H at a predetermined position in the game outcome 530, a second screen 544 may appear such as is shown in FIG. 6B. The second screen 544 includes the interactive symbol 532H and various array symbols (indicated generally as 532) in a non-array form. The second screen may include a maze 546 through which the interactive symbol 532H may chase the other symbols 532. The movements of the interactive symbol 532H may be controlled by the player via the interactive symbol controller 214A. Upon catching one of the other symbols 532K, such as is shown in FIG. 6C, the caught symbol 532K will perceptibly interact with the interactive symbol 532H with the caught symbol 532K being transformed into a new symbol 532K' as is seen in FIG. 6D. After the transformation of the caught symbol 532K into the new symbol 532K', all symbols may be placed back on the display screen in the array form of rows 534A-534C and columns (reels) 536A-536E with the new/transformed symbol 532K' replacing the original symbol 532K such that the paylines associated therewith reflected new payouts as is seen in FIG. 6E.

By allowing the player to control the movements of the interactive symbol 532H during the "chase," the player is also permitted to select and pursue a particular symbol in anticipation of altering the payouts associated with specific paylines 542. Variations of the "chase" might include designation of some array symbols, or introduction of additional symbols, for pursuit of the interactive symbol 532H. If the interactive symbol 532H was caught first (i.e., prior to the interactive symbol 532H catching one of the other symbols 532) then the screen might revert back to the original outcome 530 (FIG. 6A) or a penalty, for example the loss of credits, might be imposed.

Figure 7:
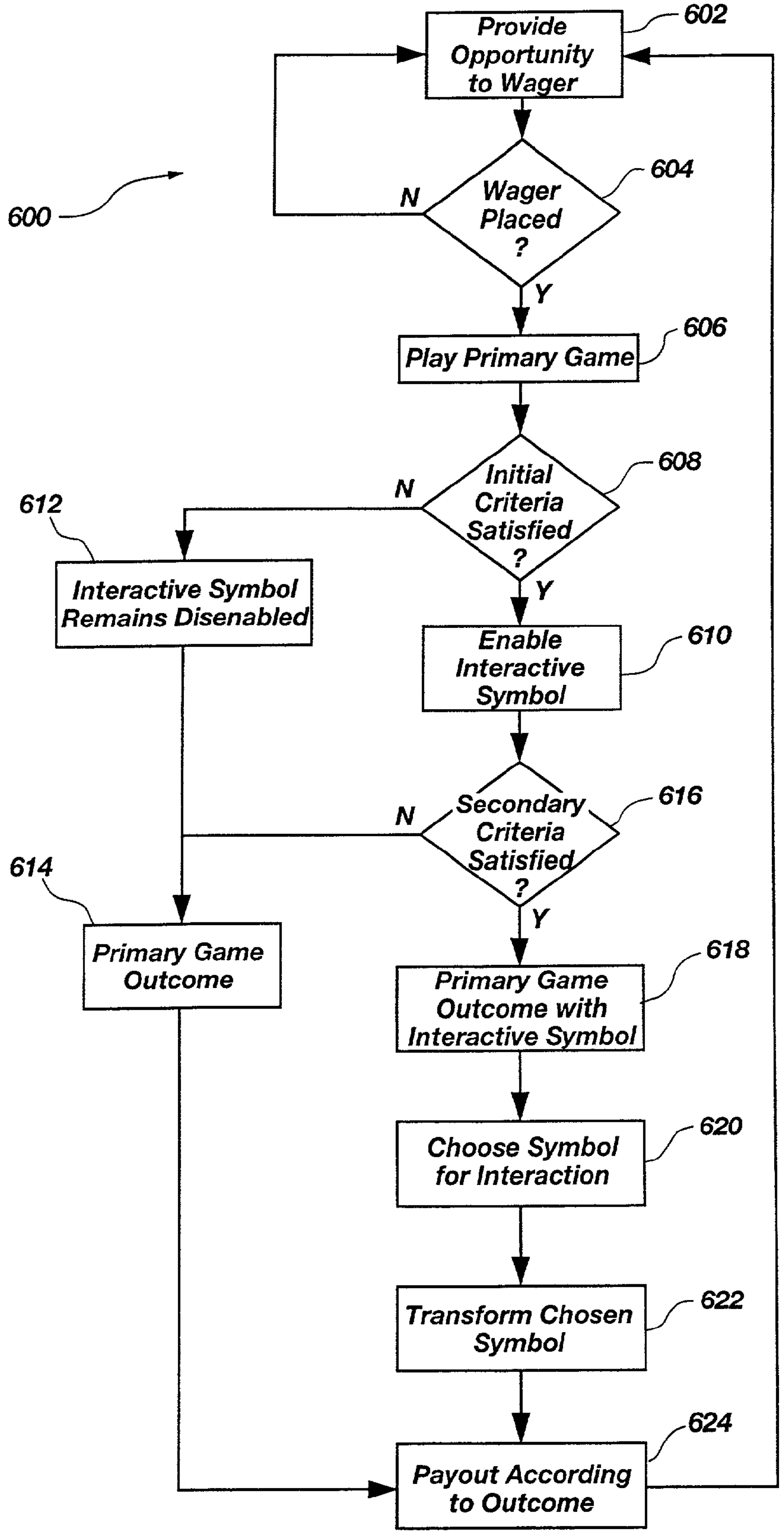
FIG. 7 is a flow diagram showing an exemplary method of conducting a game of chance according to an embodiment of the present invention.

Referring now to FIG. 7, an exemplary method 600 of conducting a game of chance commensurate with various aspects of the above-disclosed embodiments is shown. The method 600 includes providing a player with an opportunity to wager as indicated at 602. As shown at 604, it will be determined if a wager has been placed, and if so a primary game will be played as seen at 606. If a wager has not been placed, the opportunity to wager will continue to be provided as at 602. Upon play of the primary game 606, it will be determined if initial criteria have been satisfied for enablement of interactive play as shown at 608.

As discussed earlier, the initial criteria may include, for example, the placement of a maximum wager, the placement of a wager at a predetermined level greater than the minimum wager but less than the maximum wager, or wagering by the player at a predetermined rate of wagering or play of the primary game. Alternatively, if desired, the need for initial criteria may be waived and interactive play may be enabled as a default operating mode.

Upon satisfaction of the initial criteria, interactive play, through display and operation of an interactive symbol, is enabled as indicated at 610. If the initial criteria is not satisfied, interactive play will remain disenabled as indicated at 612 and a primary game outcome will be displayed as shown at 614. Such a primary game outcome may include the display of a randomly generated combination of symbols positioned on at least one payline such as set forth with regard to some of the embodiments discussed above herein.

It is noted that the interactive symbol may appear in a gaming outcome, such as in step 614 even though interactive mode is disenabled. In such a case, the interactive symbol might act as any other symbol representing a particular combination of randomly selected and displayed symbols from which a payout may be obtained.

If interactive play is enabled, it will be determined if secondary criteria have been met as indicated at 616. As set forth above, secondary criteria may include, for example, the random selection of a specified symbol, such as the interactive symbol, for display at any location on the display screen. Alternatively, secondary criteria may include the random selection of a specified symbol for display at a specified location on the display screen. Depending on the embodiment employed, another criteria might include the payout associated with a particular payline being either greater than or less than a specified level. For example, a losing outcome might satisfy the secondary criteria and trigger interactive play for second chance winnings. Alternatively, it might be desirable to provide interactive play upon a winning hand, depending on an operator's preference.

If the secondary criteria has not been met, the primary game outcome will be displayed without any associated interactive play as indicated at 614. If secondary criteria has been satisfied, the primary game outcome will be displayed including the display of an interactive gaming symbol as shown at 618. Upon the display of an enabled interactive symbol, another symbol will be chosen for perceived interaction with the interactive symbol as shown at 620. The selection of the symbol may be accomplished by player interaction via interactive controls supplied on the gaming machine. Alternatively, the selection of a symbol may be a random selection performed by the gaming unit. Another alternative of selecting a symbol for interaction with the interactive symbol might be a combination of both player selection and randomness. For example, the player might choose two or more symbols, with the gaming unit subsequently randomly selecting from the two or more player selected symbols.

After a symbol has been selected for perceived interaction with the interactive symbol, the selected symbol will be perceptibly transformed into a new, randomly selected symbol as shown at 622. The transformation of the selected symbol may have the effect of altering the initial outcome of the primary game by placing a new symbol in one or more paylines of the primary game. Alternatively, the symbol may be perceptibly transformed into an indicator of an award multiplier, or an award amount independent of any payout associated with the outcome of the primary game. The gaming unit may then provide or otherwise indicate the payout according to the outcome of the game as is indicated at 624.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A gaming device comprising:

a display device;

an input device;

a memory device; and a processor operatively coupled to the display device, the input device, and the memory device, the processor being programmed to:

(a) cause the display device to display a plurality of reels, each one of the reels displaying a plurality of symbols including a first symbol and a second symbol, (b) receive a wager, (c) cause the display device to display the reels moving, (d) cause the display device to display the reels stopped so as to cause the stopped reels to display a plurality of combinations of the symbols, (e) receive a player input from the input device, the player input being associated with a movement of the first symbol displayed on one of the stopped reels, the movement occurring relative to at least said stopped reel, (f) cause the display device to display a third symbol other than the first symbol, the second symbol or any one of the other symbols of the reels;

(g) cause the display device to display the movement of the first symbol;

(h) cause the display device to display an interaction between the first symbol and the third symbol, the interaction being affected by the player input;

(i) select the second symbol based, at least in part, on the interaction, thereby changing the second symbol so as to change at least one of the combinations of symbols to a different one of the combinations of symbols, (j) evaluate the different combination of symbols, and (k) determine whether a payout is due based, at least in part, on the evaluation.

2. The gaming device of claim 1, wherein the movement includes simulated movement selected from the group consisting of an angular movement, a rotational movement, orientation, a spinning movement, a forward movement, a backward movement, a left movement, and a right movement.

3. The gaming device of claim 1, wherein the player input includes a steering input receivable by the processor to control a direction of travel of the first symbol.

4. The gaming device of claim 1, which includes a simulation of the first symbol causing the third symbol to move to the second symbol, the processor being programmed to cause the display device to display the simulation.

5. A gaming system comprising:

at least one processor; and at least one data storage device operatively coupled to the processor, the data storage device storing a plurality of instructions which are executable to:

(a) cause a plurality of reels o be displayed, each one of the reels displaying a plurality of symbols including a first symbol and a second symbol, (b) receive a wager, (c) cause the reels to be displayed as moving, (d) cause the reels to be displayed as stopped so as to cause the stopped reels to display a plurality of combinations of the symbols, (e) receive a player input from the input device, the player input being associated with a movement of the first symbol displayed on one of the stopped reels, the movement occurring relative to at least said stopped reel, (f) cause a third symbol to be displayed, the third symbol being other than the first symbol, the second symbol or any one of the other symbols of the reels, (g) cause the movement of the first symbol to be displayed, (h) cause an interaction to be displayed, the interaction occurring between the first symbol and the third symbol, the interaction being affected by the player input, (i) select the second symbol based, at least in part, on the interaction, thereby changing the second symbol so as to change at least one of the combinations of symbols to a different one of the combinations of symbols, (j) evaluate the different combination of symbols, and (k) determine whether a payout is due based, at least in part, on the evaluation.

6. The system of claim 5, wherein the movement includes simulated movement selected from the group consisting of an angular movement, a rotational movement, orientation, a spinning movement, a forward movement, a backward movement, a left movement, and a right movement.

7. The system of claim 5, wherein the player input includes a steering input receivable by the processor to control a direction of travel of the first symbol.

8. The gaming device of claim 5, which includes a simulation of the first symbol causing the third symbol to move to the second symbol, the data storage device storing at least one additional instruction which is executable to cause the simulation to be displayed.

9. A method of a gaming device comprising:

causing a plurality of reels to be displayed, wherein each one of the reels displays a plurality of symbols including a first symbol and a second symbol;

receiving a wager;

displaying the reels moving;

displaying the reels as stopped so as to cause the stopped reels to display a plurality of combinations of the symbols;

receiving a player input from the input device, wherein the player input is associated with a movement of the first symbol displayed on one of the stopped reels, wherein the movement occurs relative to at least said stopped reel;

displaying a third symbol other than the first symbol, the second symbol or any one of the other symbols of the reels;

displaying the movement of the first symbol;

displaying an interaction between the first symbol and the third symbol, wherein the interaction is affected by the player input;

selecting the second symbol based, at least in part, on the interaction, thereby changing the second symbol so as to change at least one of the combinations of symbols to a different one of the combinations of symbols;

evaluating the different combination of symbols; and determining whether a payout is due based, at least in part, on the evaluation.

10. The method of claim 9, wherein displaying the movement includes simulating a movement selected from the group consisting of an angular movement, a rotational movement, orientation, a spinning movement, a forward movement, a backward movement, a left movement, and a right movement.

11. The method of claim 9, wherein receiving the player input includes receiving a steering input to control a direction of travel of the first symbol.

12. The method of claim 9, which includes displaying a simulation of the first symbol causing the third symbol to move to the second symbol.

* * * * *